June 14, 1955 KERN K. N. CHANG ET AL 2,710,923
INJECTION LOCKING OF MAGNETRONS
Filed Nov. 14, 1952 6 Sheets-Sheet 1

INVENTORS
KERN K. N. CHANG &
JOHN S. DONAL, JR.
BY Charles H. Brown
ATTORNEY

INVENTORS
KERN K. N. CHANG &
JOHN S. DONAL, JR.

BY Charles H. Brown,
ATTORNEY

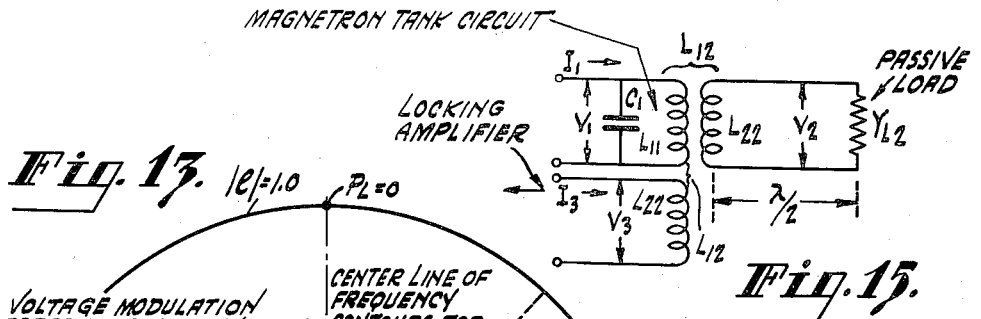
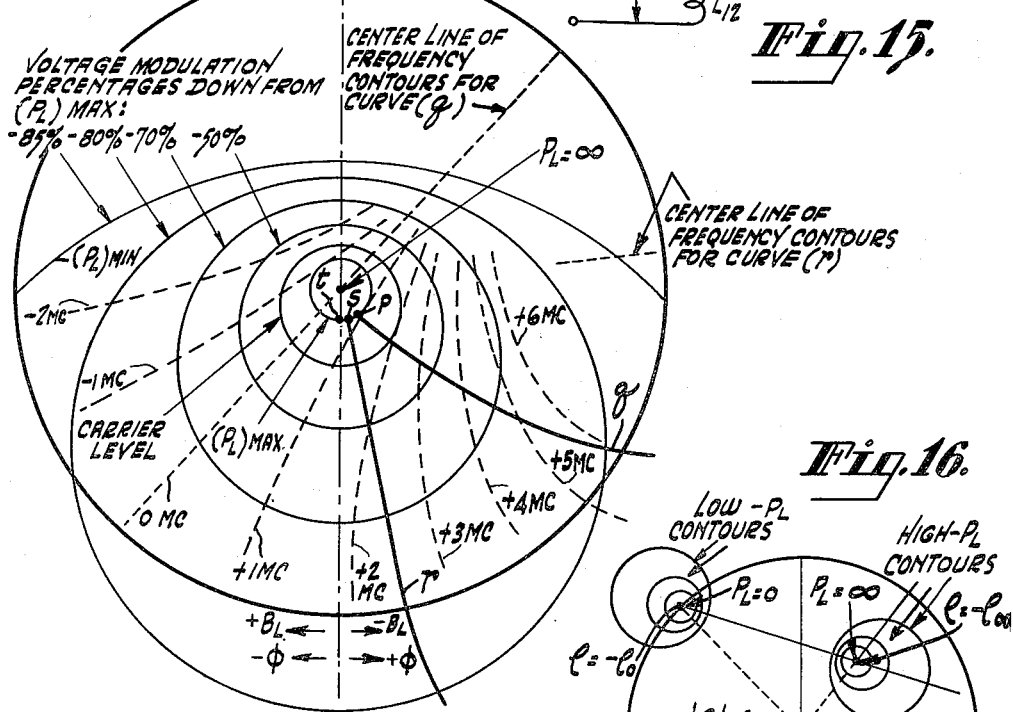
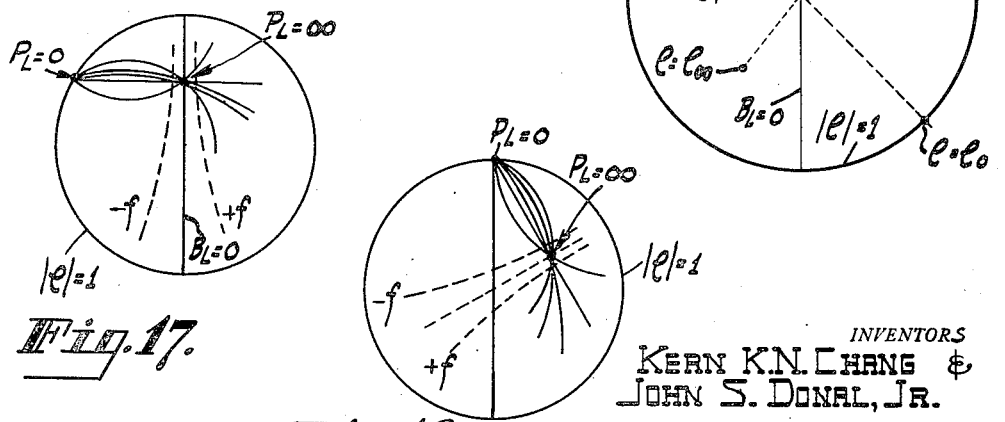

United States Patent Office 2,710,923
Patented June 14, 1955

2,710,923

INJECTION LOCKING OF MAGNETRONS

Kern K. N. Chang and John S. Donal, Jr., Princeton, N. J., assignors to Radio Corporation of America, a corporation of Delaware Application November 14, 1952, Serial No. 320,576

27 Claims. (Cl. 250—36)

This invention relates to improved circuit arrangements for locking or stabilizing the frequency of magnetron oscillators, and more particularly to the injection locking of magnetrons.

"Injection locking" of magnetrons may be defined as the phase control of a continuous wave (C. W.) or a pulsed magnetron during anode modulation, by the injection of a signal for stabilizing the frequency of the magnetron. This injection signal is supplied from a crystal-controlled source to the magnetron through a control amplifier, as a result of which the magnetron is synchronized by the crystal-controlled source. A definite phase relation is established between the radio frequency (R. F.) voltage of the magnetron and that of the control amplifier. The frequency change accompanying anode modulation of the magnetron (known as "pushing") is effectively suppressed and converted into a phase modulation that is usually much less than $\pm 90°$ and is substantially independent of the modulation frequency, at least for low modulation frequencies. It would perhaps be more illuminating to describe locking in the following qualitative manner. The locking amplifier sends a wave of fixed frequency to the magnetron. For phase comparison purposes the phase of this wave at the magnetron may be taken as reference phase. If the magnetron tries to increase its frequency, its outgoing wave advances in phase. The result is a relative lag in phase between the wave incident on the magnetron (the locking signal) and the voltage wave from the magnetron. However, a lagging incident wave, analogous to that reflected from a capacitive load, always adds positive susceptance to the resonant system and reduces the magnetron frequency. If the effect is insufficient, the magnetron will continue to advance its relative phase until the angle opens up to the point where the susceptance presented to the magnetron exactly corrects the change in susceptance that produced the original frequency increase. Thus, an equilibrium state is reached in which there is a fixed phase angle between the wave from the magnetron and the wave from the locking source. Since there is this fixed phase relation, the magnetron frequency is synchronous with that kind of the locking source.

In the copending Koros application, Serial No. 177,455, filed August 3, 1950, there are disclosed various arrangements for stabilizing the frequency of a magnetron oscillator, the frequency stabilization or locking being effected by the injection of a crystal-controlled standard frequency into the transmission line between the magnetron and the load. The magnetron described in the aforesaid Koros application has only one coupling loop and may be termed a "one-loop" magnetron. The standard frequency employed in this Koros application is either a subharmonic of the magnetron frequency or a frequency equal to that of the magnetron oscillator. Upon actual construction and operation of the invention disclosed in said Koros application, it was found that there was a tendency toward undesired phase modulation, when amplitude modulation of the magnetron oscillator was attempted. The present invention overcomes this tendency toward undesired phase modulation and constitutes an improvement over the system of said Koros application.

An object of this invention is to devise novel circuit arrangements for the injection locking of magnetrons.

Another object is to provide a locking-branch circuit for the injection locking of magnetrons, which produces a constant locking current at the junction between the locking branch and main transmission lines.

Still another object is to devise a locking-branch circuit which does not introduce any phase modulation between the injection current at the junction and the grid excitation of the locking amplifier.

Yet another object is to devise a circuit arrangement, for injection locking, whereby the system phase modulation may be greatly decreased and, in fact, may be brought to substantially zero.

A further object is to provide a circuit arrangement by means of which the required size of the locking amplifier may be greatly reduced.

A still further object is to provide a novel injection locking system in which the system phase modulation is effectively reduced to zero.

The foregoing and other objects of the invention are accomplished, briefly, in the following manner: In one embodiment employing a magnetron having only a single coupling loop, there is utilized a locking-branch circuit having a capacitive stub in the injection or locking branch transmission line. This stub is spaced a half-wave from the locking (control) amplifier and a quarter-wave from the junction point between the main and injection branch transmission lines. In another embodiment, a magnetron is used having two coupling loops, one for the injection of locking power and the other for the abstraction of load power from the magnetron. In this embodiment, a somewhat similar locking branch circuit is used in association with the first loop, but in this case the capacitive stub is spaced either a quarter-wave or a half-wave from the first (injection) loop (instead of from the junction point between injection branch and main transmission lines). In the case of the one-loop magnetron, the length of the line between the magnetron reference plane and the junction point may be adjusted to provide an optimum impedance transformation between such junction point and the magnetron, to give a greatly decreased phase modulation, together with the minimum injection power. For the one-loop or two-loop magnetrons, the value of the passive load is adjusted, relative to the characteristic impedance of the line, to give minimum locking power and decreased system phase modulation. In a third embodiment, a constant-phase locking system is obtained by amplitude modulating the voltage produced at the junction by the locking amplifier, according to approximately the same function of time as followed by the junction voltage produced by the magnetron.

The foregoing and other objects of the invention will be best understood from the following description of some exemplifications thereof, reference being had to the accompanying drawings, wherein:

Fig. 13 is a chart similar to Fig. 12, but illustrating the effect of changing the line length;

Fig. 15 is a diagram of the equivalent circuit of Fig. 14;

Fig. 16 is an admittance chart, with load power contours, for an injection-locked two-loop magnetron;

Fig. 17 is a Rieke diagram for a two-loop magnetron, with paths of zero phase modulation; and Fig. 18 is a Rieke diagram for a one-loop magnetron, with paths of zero phase modulation.

Figure 1:
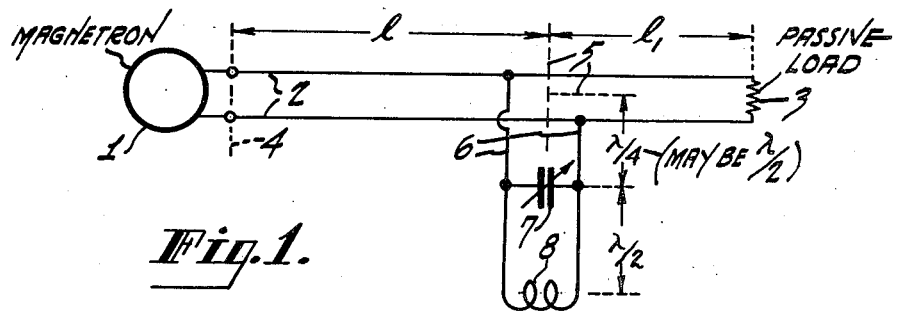
Fig. 1 is a schematic diagram of an injection locking circuit according to this invention, using a one-loop magnetron.

Referring to the drawings in more detail, Fig. 1 is a schematic diagram of an injection locking circuit according to one embodiment of this invention, for a "one-loop" magnetron (that is, for a magnetron having only one coupling loop). The magnetron oscillator 1 is connected by means of a main transmission line 2 to a passive load 3 which, as will become apparent hereinafter, may be either matched or mismatched to the line 2. Load 3 may be an antenna or other useful load. Preferably, the line 2 is a coaxial line, although for convenience in illustration it is shown as an open-wire line. The effective reference plane of the magnetron is indicated at 4. At a distance $l$ from plane 4 (measured in the direction of load 3) the junction plane 5 is located. This last plane is the junction between the main and locking-branch transmission lines and herein will be referred to as "the junction." The junction is located a distance $l_1$ from load 3 along transmission line 2. Distance $l_1$ may be a half-wavelength, but this is not absolutely necessary, since it is the load presented at the junction 5 which is of importance, as will be seen hereinafter.

At the junction 5 there is connected a locking branch transmission line 6 which, although illustrated as an open-wire line for convenience, is preferably a coaxial line. At a point on branch line 6 spaced a quarter-wavelength from junction 5, there is placed a variable capacitance 7, which is preferably a tunable capacitive stub. Capacitance 7 is connected across transmission line 6. The effective reference plane of the injection locking amplifier is located a distance of a half-wavelength from capacitance 7, measured in a direction away from junction 5. At this reference plane, and connected across the transmission line 6, is a coil 8 which is inductively coupled to the tuned anode circuit 9 of a locking amplifier which may consist of a triode vacuum tube 10 operating as a grounded-grid doubler. For example, tube 10 may be of the A2214–J type. The grid excitation of the locking amplifier tube 10 is obtained from a crystal-controlled source (not shown) of standard or stable frequency. The output of this source is applied to grid 11 of triode 10, as indicated. The stable, crystal-controlled locking signal input applied to grid 11 of tube 10 is amplified in this tube and the second harmonic thereof is selected by circuit 9 and applied to junction 5 by means of the branch transmission line 6.

The stable second harmonic frequency applied to junction 5 is made to be equal to the particular output frequency of magnetron 1 which is desired to be stabilized in value. In other words, the magnetron 1 is so energized by operating potentials as to develop oscillatory energy of a frequency determined by the physical construction thereof, this frequency being variable within a certain range by the magnetron tuner. The frequency applied to junction 5 (injected into this junction) has a pre-determined value to which it is desired to lock the magnetron frequency.

As previously stated, certain line lengths are measured to the effective or reference planes of the magnetron and the locking amplifier. For the magnetron, this plane might be defined as the plane at which a variation of conductance, with zero susceptance, gives approximately constant frequency. For the one-loop magnetron 1 it can be determined by finding the non-oscillating tank resonant frequency as the frequency for minimum voltage standing wave ratio (VSWR) when the tank is driven with a signal generator. The reference plane is then $n\lambda/2$ from a standing wave maximum. An analogous procedure is used to find the reference plane of the locking amplifier.

As previously explained, the magnetron 1 operates as an oscillator, to produce radio frequency energy which is transmitted to the load 3. The magnetron 1 is anode-modulated in any suitable manner (not shown), in order to produce amplitude modulation of the radio frequency energy appearing in the load. The modulating signal may be of any suitable type, as for example a composite television video signal. A television transmitter, as is well known, requires square-wave reproduction in a wide-band system using vestigial sideband transmission.

It will be assumed herein that the second harmonic component of the anode current of the grounded-grid triode 10 is constant during the modulation cycle. This is a logical assumption, since analysis of an experimental locking circuit arrangement constructed according to the disclosure in the aforementioned Koros application, using an A2214–J as the locking amplifier triode 10, shows this to be the case. It will now be shown that a proper choice of the circuit parameters of Fig. 1 will make the current injected at the junction 5 constant and of a value of one ampere. Furthermore, this circuit will eliminate any phase modulation between the injected current at the junction and the voltage on the grid 11 of the locking amplifier.

Figure 2:
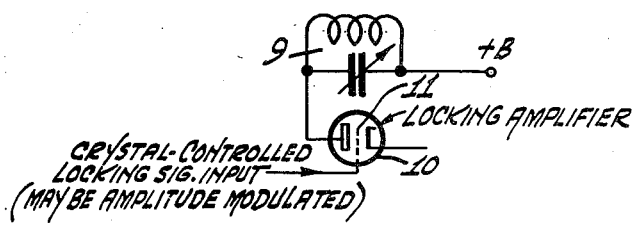
Figs. 2, 3 and 4 are various representations of the locking-branch circuit portion of Fig. 1.

Fig. 2 is a schematic representation of the locking branch circuit of Fig. 1, with symbols for the various circuit components. The value given for $I_D$ (second harmonic component) is the value found from an analysis and computation of the aforementioned experimental locking circuit arrangement. A coefficient of coupling, K, of 0.15 is a reasonable assumption. $C_1$, approximately 6 mmfd., is the grid-plate capacitance of the A2214–J, while the tank inductance, $L_{11}$, must have the proper value for resonance at 825 mc., which is the assumed second harmonic output frequency of the locking amplifier and also the frequency of the magnetron being stabilized. From the loop dimensions the loop inductance, $L_{22}$, was first assumed to be $10^{-8}$ henry, then was reduced a few percent. to round off the value of loop reactance. $C_2$ is the capacitance 7 presented by the capacitive stub, previously referred to, effectively across the loop 8. From the foregoing, the tank inductive reactance comes out to be $j32$ ohms and the loop reactance, $j50$ ohms.

Figure 3:
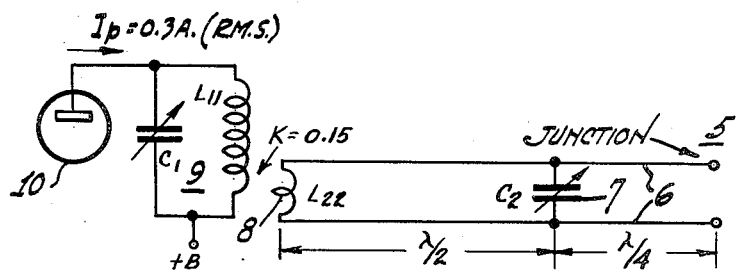

Fig. 3 is an equivalent circuit of the locking branch of Fig. 2. The equivalent reactances and susceptances were obtained by a procedure which is essentially the nodal admittance method. Using the values previously found for tank reactance and loop reactance, at 825 mc., $j\omega L_{12} = j6$ ohms. From the nodal admittance analysis, the equivalent susceptances of Fig. 3 are:

$$B_{11} + B_{12} = \frac{1}{j\omega}\left[\frac{L_{22}}{L_{11}L_{22} - L_{12}^2} - \frac{L_{12}}{L_{11}L_{22} - L_{12}^2}\right] = \frac{j44}{j^2(1564)} \text{ mhos} \quad (1)$$

$$B_{12} - B_{22} = \frac{1}{j\omega}\left[-\frac{L_{12}}{L_{11}L_{22} - L_{12}^2} + \frac{L_{11}}{L_{11}L_{22} - L_{12}^2}\right] = \frac{j26}{j^2(1564)} \text{ mhos} \quad (2)$$

The equivalent inductive reactances of $B_{11}+B_{12}$ and $B_{12}+B_{22}$ are respectively, $$j\omega L'_{11}=\frac{1}{B_{11}+B_{12}}=j35.5 \text{ ohms} \qquad (3)$$

$$j\omega L'_{22}=\frac{1}{B_{12}+B_{22}}=j60.1 \text{ ohms} \qquad (4)$$

From the expression previously given for $j\omega L_{12}$, $$-B_{12}=\frac{1}{j\omega}\left[\frac{L_{12}}{L_{11}L_{22}-L_{12}^2}\right]=\frac{6}{j1564}\text{mhos} \qquad (5)$$

so that the equivalent inductive reactance of $-B_{12}$ is $$j\omega L'_{12}=j261 \text{ ohms} \qquad (6)$$

The magnetron 1 plus the matched 50-ohm load 3 (Fig. 1) present a rather wide range of loading, to the locking amplifier branch, at the junction 5. As an example, a certain path of operating points (on the junction admittance chart, to be later explained in detail) gives the admittances presented by the magnetron at carrier level and at the top and bottom of the modulation cycle for 85% (television) modulation. If these admittances are combined with that of the load, the impedances presented to the locking amplifier branch are:

$$Z_{\text{top}}=150+j217 \text{ ohms}$$
$$Z_{\text{carr}}=130+j0 \text{ ohms}$$
$$Z_{\text{bot}}=35.7-j6.2 \text{ ohms} \qquad (7)$$

Figure 4:
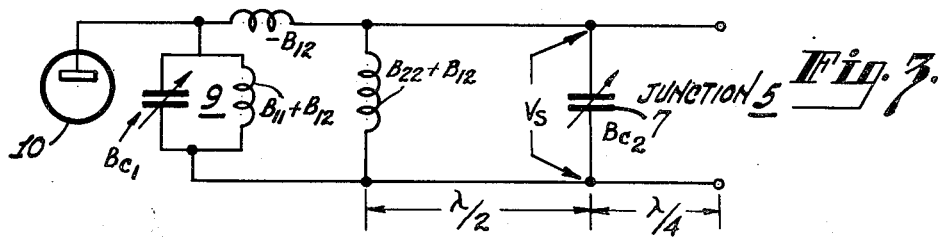

It will now be shown that a proper choice of $C_2$ (Fig. 2) and a slight detuning of the tank circuit 9 (Fig. 2) cause an approximately constant current of one ampere to be injected at the junction. The equivalent mesh or simplified equivalent circuit of Fig. 4 is used, where $Z_4$ is the complex load of (7) after transformation by the $\lambda/4$ line of Fig. 3, $Z_1$ replaces the tank 9 of Fig. 3, $Z_2$ replaces $-B_{12}$, and $Z_3$ replaces $B_{22}+B_{12}$ and $B_{c_2}$ in combination. The mesh equations for Fig. 4 may be solved for $i_1$ to give $$i_1=\frac{i_p Z_1(Z_4+Z_3)}{Z_4(Z_1+Z_2+Z_3)+Z_3(Z_1+Z_2)} \qquad (8)$$

Let it be assumed that $V_s$ (Fig. 3) is the voltage across $B_{c_2}$ and that $I_R$, the current in the load $Z_4$, is to be made one ampere. For the quarter-wave section of line in Fig. 3, at $Z_3$, which is distant $\lambda/4$ from $Z_4$, the voltage is $$V_s=jZ_0I_R=j(50)(1) \text{ volts} \qquad (9)$$

A value of $-j1$ is chosen for the reactance of $C_2$. The equivalent reactance of $B_{12}+B_{22}$ is 60.1 ohms, from (4), and may be neglected compared to $-j1$, so that $Z_3=-j1$. In addition, $Z_4$ is so large (always 10 ohms or more) compared to $Z_3$ (see Equation 7) that $i_2$ may be neglected compared to $i_1$. Therefore, $$i_1=\frac{V_s}{Z_3}=\frac{-j50}{-j1}=50 \text{ amperes} \qquad (10)$$

$Z_3$ may be neglected, compared to $Z_4$, in Equation 8, which becomes $$i_1=\frac{i_p Z_1}{Z_1+Z_2+Z_3} \qquad (11)$$

Substituting $i_p=0.3$ ampere, $Z_3=-j1$, and the values of $Z_2$ and $i_1$ from (6) and (10), respectively, we find $$Z_1=j261 \text{ ohms} \qquad (12)$$

But $$Y_1=\frac{1}{Z_1}=B_{11}+B_{12}+B_{c_1} \qquad (13)$$

so $B_{c_1}$ has the value $$B_{c_1}=j0.00383+j0.0281=j0.03193 \text{ mhos}$$

when $B_{11}+B_{12}$ is obtained from (1). It follows that $$-\frac{1}{j\omega C_1}=-j31.3 \text{ ohms} \qquad (14)$$

instead of the original value of $-j32$ ohms, computed for the value of $C_1$ of 6 mmfd. The result shows that the tank circuit 9 must be detuned slightly to produce the desired one ampere at the junction 5.

To summarize the foregoing, the choice of $-j1$ for the reactance of $C_2$ makes the equivalent impedance of $B_{22}-B_{12}$ and the impedance of $Z_4$ both so high that they may be neglected compared to the impedance of $C_2$. A slight detuning of the tank 9, to adjust $Z_1$, yields a value of one ampere for the load current.

Since $Z_3$ is made small compared to $Z_4$, $i_1$ is constant throughout the modulation cycle and independent of $Z_4$, as may be seen from Equation 11. As a result, $V_s$ is constant throughout the modulation cycle, see Equation 10. Therefore, the junction current, or the injection or locking current at the junction ($I_R$ of Equation 9) is constant throughout the modulation cycle, and independent of $Z_4$. Therefore, with the circuit of Fig. 1 a constant locking current (constant throughout the modulation cycle) is produced at the junction 5. If the injected current were variable, the system might break out of lock or give very high phase modulation.

The phase of the injected current with respect to that of $i_p$ is constant and independent of $Z_4$ for the following reasons. When $Z_3$ is small, $Z_4$ disappears from (8), with the result that $i_1$ is constant in phase with respect to $i_p$, see Equation 11. The phase of $V_s$ is constant with respect to $i_1$, from Equation 10, and $i_R$ in turn bears a constant phase relation to $V_s$, from Equation 9. Thus, there is no phase shift of the current injected at the junction, during the modulation cycle, with respect to the second-harmonic plate current, $i_p$. But it has been assumed above that the tube 10 is a constant-current generator, the second harmonic component $i_p$ of the plate current being constant during the modulation cycle. Therefore, it is obvious that the phase of the plate current, $i_p$, with respect to the grid voltage or drive, must be a constant, independent of the load. Consequently, the current injected at the junction 5 is constant in phase with relation to the grid drive or excitation applied to grid 11, during the modulation cycle. In other words, the locking-branch circuit of Fig. 1 introduces no additional phase modulation; if it did introduce such additional phase modulation, this might very well be in such a direction as to increase the system phase modulation.

It would be very desirable to know how much information concerning a new magnetron must be available before an adequate locking amplifier, for injection locking purposes, can be chosen. The power output and dissipation requirements placed on the amplifier should be known. Also, excessive radio frequency phase modulation seriously degrades square-wave reproduction in any wide-band system when vestigial sideband transmission is used; a television transmitter is an example of a system of this type. Therefore, it is desirable to be able to predict the phase modulation expected from a magnetron-locking amplifier combination. Finally, once a circuit has been chosen, one should know how to adjust the circuit and the magnetron variables so that the minimum phase modulation can be obtained. An analysis, answering the above questions, will now be presented.

The only radio frequency phase shifts or phase modulation in the system are those between the voltage across the junction (or the load) and the injected current. For the following analysis, it will be assumed that the injected current or locking current at the junction 5 is constant throughout the modulation cycle, and that there is no additional phase modulation in the locking amplifier branch (that is, there is zero phase modulation between the injected current and the grid excitation of the locking amplifier). As previously explained, these assumptions are justified, and are in fact entirely true, for the circuit of Fig. 1.

An analysis of the locking circuit of Fig. 1 gives the following expressions for the power in the load 3, $P_L$, and the total power output of the locking amplifier, $P_{LA}$, in terms of the characteristic admittance of the transmission line 2, $Y_0$, the locking current, $I$, and the magpitude, $\rho$, and the phase, $\phi'$, of the reflection coefficient at the junction 5:

$$P_L = \frac{(1+2|\rho|\cos\phi' + |\rho|^2)}{4Y_0|\rho|^2} \cdot I^2 \qquad (15)$$

and $$P_{LA} = \frac{I^2}{2Y_0|\rho|}(\cos\phi' + |\rho|) \qquad (16)$$

*One-loop case, matched load, half-wave line*

The line 2 between the junction 5 and the magnetron 1 is assumed to have a known length, $l$; therefore, the load power $P_L$ is known in terms of the reflection coefficient at the magnetron reference plane 4. It will now be assumed that $l$ is an integral multiple of a half-wave. $\phi$ (of the Rieke diagram of the magnetron) is then equal to $\phi'$ and the impedance chart at the junction 5 is the same as at the magnetron reference plane 4. The effect of the adjustment of line length $l$ to a different value will be explained hereinafter.

An ordinary Rieke diagram is a plot of the power output and frequency of an oscillator, usually a magnetron, as a function of the standing wave ratio (or reflection coefficient) and the position of the minimum in the line connecting the tube to the load. If the plotted data are properly oriented with respect to the circular scale, the values of $|\rho|$ and the position of the minimum may be converted to the normalized admittance or to normalized conductance, $\overline{G_L}$, and normalized susceptance, $\overline{B_L}$, presented at the reference plane of the magnetron. The contours of constant frequency should intersect the $\overline{B_L}$ contours at an angle, while the constant power contours are roughly parallel to the $\overline{G_L}$ contours. The Rieke diagram, then, tells nothing about pushing, but gives the variation of oscillatory performance with loading. The data are taken at a single magnetic field and, usually, with the input current held constant.

Figure 5:
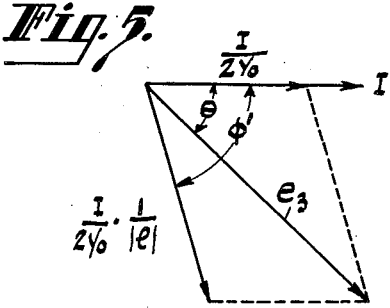
Fig. 5 is a vector diagram of certain voltages.

Fig. 5 is a vector diagram of the voltages at the junction 5. In this diagram, $e_3$ represents the total voltage at the junction and, therefore, the voltage across the load 3. $\theta$ is the phase angle, at the junction, between the total voltage and the current, $I$, from the locking amplifier. $\phi'$ and $|\rho|$ represent the same factors previously referred to. The vector diagram of Fig. 5 permits the determination of the phase of the radio frequency voltage across the load, with reference to the current injected at the junction, from a knowledge of the complex reflection coefficient at the magnetron plane or at the junction.

Although Equation 15 gives the load power in terms of the reflection coefficient, this information is insufficient to determine the phase modulation as a function of load power, for this power can be produced by an infinite number of pairs of values of $|\rho|$ and $\phi$, while each pair gives a different phase angle by use of the vector diagram, Fig. 5. It will be shown that the magnetron pushing determines which pair of values of $|\rho|$ and $\phi$ to choose, and so uniquely determines the phase modulation.

As previously stated, it will be assumed that $I$ is constant throughout the modulation cycle and that the total phase modulation is given by the phase variation between $I$ and the voltage across the load. As before, the value of $I$ will be assumed as one ampere.

We will now return to the Rieke diagram for a moment. Suppose that the frequency of the unlocked magnetron is 825 mc. with a matched load, and that this frequency is for an anode current of one ampere, for which we have the Rieke diagram. If the anode current is now reduced to 0.5 ampere, we have an almost identical Rieke diagram for the lower current, with the exception that the numbers on every frequency contour are changed by the same amount. If the change in anode current reduces the matched-load frequency from 825 to 824 mc., this contour is numbered 824 in the new diagram. If the frequency is to be returned to 825 mc. by changing the load, the new load must lie on the first contour to the right, or the 825-mc. contour of the 0.5 ampere diagram. Only one diagram is actually necessary, of course. If the frequency is reduced by one mc. the correcting load required of the locking system must lie on the contour for one mc. higher in frequency. Thus, if the unlocked magnetron frequency is known at any part of the modulation cycle, frequency correction is obtained if the locking system presents a load that lies on the correct frequency contour of the Rieke diagram.

Therefore, a procedure for the determination of phase modulation would be: (a) assume a series of powers in the antenna, (b) determine the magnetron currents, (c) determine the successive frequencies from the currents and from pushing data, (d) from the frequency choose the correct pair of values of $|\rho|$ and $\phi$ to determine the operating point on the Rieke diagram, (e) from the phase of the reflection coefficient, corresponding to the operating point, determine the successive values of phase in the antenna. The last, for the whole modulation cycle, is the desired phase modulation.

It will be assumed that the pushing is the same for all points on the Rieke diagram, since the variation of pushing (which is in turn the variation of frequency with anode current) with the load conductance, $G_L$, may for present purposes be considered to be small.

It has been found that, to a good approximation, the magnetron anode current, $i_{mag}$, is $$i_{mag} = K P_L^{3/4} \qquad (17)$$

$K$ is evaluated by measuring the power in the load at some convenient input current level. Therefore, $i_{mag}$ is known to a reasonable approximation for each assumed power in the load. Changes in frequency, which would occur if the magnetron were not locked, can then be found from the experimental curve of frequency as a function of anode current. Such a curve is known as a "dynamic pushing curve," and an example of such curve, for a representative magnetron, is given in Fig. 6.

The assumptions and the experimental data, for the calculation of the phase modulation, may be summarized as follows: (a) The Rieke diagram is assumed to be independent of anode current, in that the frequency contours are identical in shape but have new frequency designations, determined from the pushing curve of Fig. 6, for each current. (b) The pushing is assumed to be independent of loading. (c) The magnetron anode current is assumed to vary as the three-fourths power of $P_L$, from Equation 17. (d) The line length $l$ between the magnetron 1 and the junction 5 is assumed to be $n\lambda/2$ at 825 mc. (e) The current, $I$, injected at the junction 5 is assumed to have a value of one ampere, independent of the modulation level. The locking amplifier branch circuit is so designed that there is no phase modulation between the injected current and the grid voltage applied to the locking amplifier. (f) The power in the load is assumed to be 340 watts when the magnetron current is 400 ma. Then, $K$ in Equation 17 has a value of 5.07. (g) Sine wave modulation is assumed about a carrier power level of 340 watts. The maximum modulation factor used is 0.74, or 85% voltage. modulation in television terminology.

Since the phase modulation during the amplitude modulation cycle can be determined (Fig. 5) from the successive values of the complex reflection coefficient, the operating points on the Rieke diagram are determined first. The power in the load, $P_L$, is chosen as the independent variable. Since it is of interest to determine phase modulation as a function of percentage modulation, the values of $P_L$ were chosen to be the maximum and minimum values corresponding to television modulation percentages from 30 to 85%.

Equation 15 gives $P_L$ as a function of $|\rho|$ and $\phi$. For various $P_L$s, the pairs of values of $|\rho|$ and $\phi$ are plotted as contours on Fig. 7, which is a typical Rieke diagram with superimposed $P_L$ contours and loci of operating points. The various $P_L$ contours are the circular curves marked with "carriers," or with various percentages, which denote the corresponding per cent. modulation down from peak value. It will be seen that these contours range from +85%, through carrier, to −85%. For each $P_L$, the point of operation of the magnetron will be somewhere on the corresponding contour.

Figure 7:
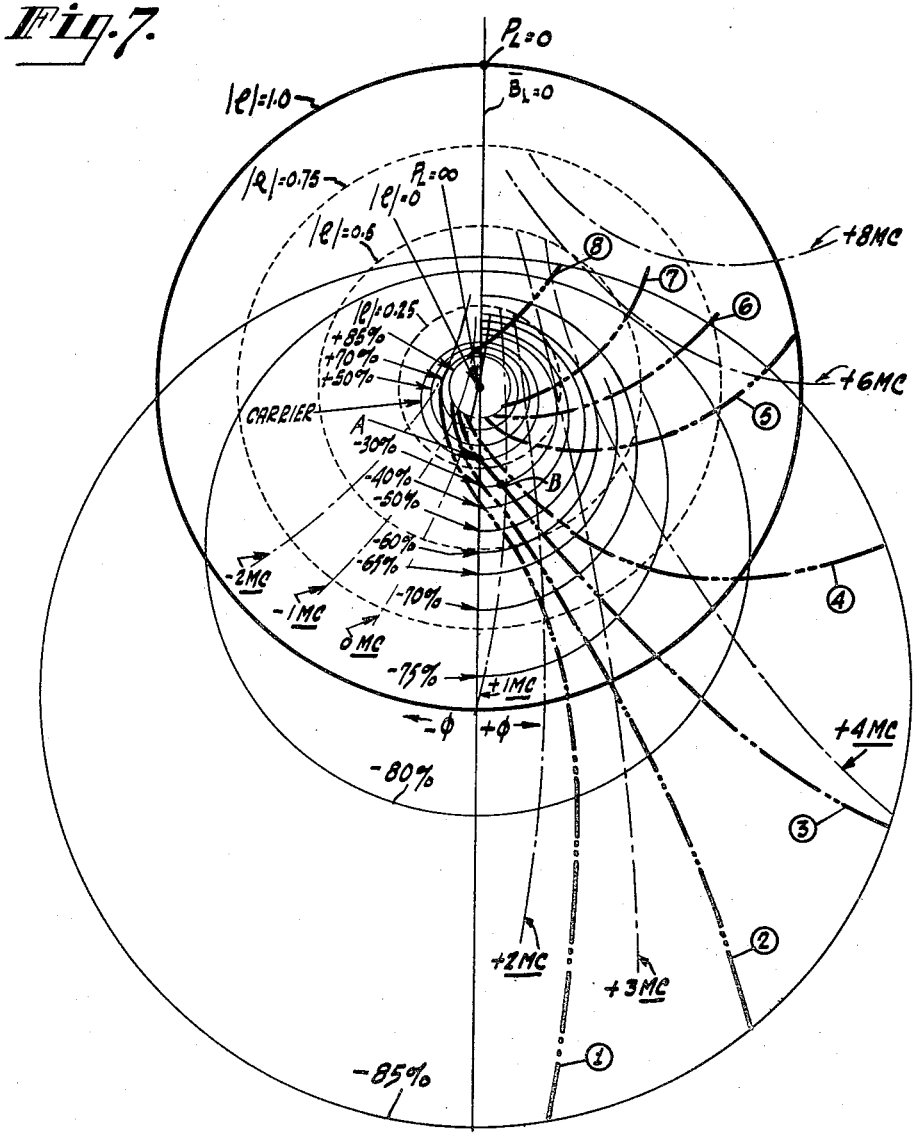
Fig. 7 is a Rieke diagram for a magnetron, with superimposed load power contours and loci of magnetron operating points.

For purposes of calculation, it is assumed that the tuner of the magnetron is adjusted so that the operating point falls at various positions on the carrier-level contour (the contour marked "carrier" in Fig. 7). The total loading presented to the magnetron, by the locking amplifier and by the useful load, can be changed by adjustment of the position of the magnetron tuner, so that the operating point at carrier level can be shifted around to various positions on the "carrier" contour in Fig. 7, by adjustment of such tuner. In the case of the path or locus numbered "2," for example, the point of operation at carrier level is near the contour (0-mc.) passing through the matched load point (at which $|\rho|=0$), which means that the tuner is so adjusted that the matched load frequency of the unlocked magnetron is that of the locking oscillator, or 825 mc. In the case of path "5," the unlocked magnetron is tuned by means of the tuner to a considerably lower frequency (about 1.7 mc. lower) for a matched load, so that a considerable susceptance at carrier level must be introduced by the locking oscillator in order to provide operation at 825 mc. Since for path "5" the magnetron is tuned, unlocked, to a lower frequency, when locking takes place the operating point will be found at the intersection of the +1.7 mc. contour (on the right of the zero susceptance line) with the "carrier" $P_L$ contour. Thus, by adjustment of the position of the magnetron tuner, the operating point at carrier level can be shifted around, for example, to the various locations indicated by the intersections of the heavy dot-dash lines (numbered "1" to "8," the paths of operating points) with the "carrier" $P_L$ contour.

For each operating point on the carrier-level contour there will be a locus of values of loading as the magnetron is modulated about carrier lever. For the path numbered "3," it is assumed that the magnetron tuner is adjusted so that the point of locked operation at carrier level is at point A, the lower intersection of the carrier contour with the zero susceptance line. Due to the curvature of the frequency contour (0-mc.) passing through the match point of Fig. 7, the magnetron tuned adjustment is slightly different from that giving an unlocked frequency of 825 mc. into a matched load (that is, that tuner adjustment for the path "2," previously referred to).

Continuing with path "3," it is assumed that $P_L$ is reduced to 231 watts, the value of the minimum power for 30% modulation, assuming 1030 watts for the maximum power at 85% modulation. The point of operation must lie on the 231-watt (−30%) $P_L$ contour. The value of $i_{mag}$ can be calculated from Equation 17, for a $P_L$ of 231 watts, and is 300 ma. From Fig. 6, the unlocked frequency would have decreased by 0.7 mc. for the change in current from 400 to 300 ma. The operating point thus found is at B, the intersection of a frequency contour 0.7 mc. higher than the frequency contour on which point A is located, with the −30% $P_L$ contour. The correction of the decrease in frequency of 0.7 mc. requires that operation takes place in the intersection of 231-watt $P_L$ contour (−30% contour) with a frequency contour 0.7 mc. above the contour through the point A, of operation at carrier level. The locus numbered "3" of operating points thus passes through points A and B in Fig. 7. A continuation of this procedure gives the complete path of operating points numbered "3."

A total of eight paths of operation are shown in Fig. 7. They are plotted in the same way as path "3" but starting at different points on the carrier $P_L$ contour, since these paths differ in the total loading presented to the magnetron at carrier level. As previously explained, these different starting points, or different carrier-level operating points, are established by various adjustments of the position of the magnetron tuner.

Since the absence of phase modulation in the locking-oscillator branch of the circuit was assumed, only the radio frequency phase modulation of the voltage across the load (or across the junction) with respect to the current, I, needs to be considered. The relative phase of the junction voltage and the injection current may be determined by the use of the vector diagram of Fig. 5. I is one ampere and $Y_0$ is 0.02 mhos. $\phi'$ is the phase angle of the reflection coefficient at the junction 5, viewed from the magnetron. Since the line length between the magnetron reference plane and the junction was made $n\lambda/2$, $\phi'$ is identical in value with the phase, $\phi$, of the reflection coefficient in Fig. 7.

The phase modulations were determined vectorially (by the use of diagrams similar to Fig. 5) for seven of the eight loci of Fig. 7. The results are plotted in Fig. 8. The reference sine wave represents the assumed sinusoidal modulation of the voltage across the load, plotted for one complete cycle. The amplitude scale is chosen so that the depth of modulation is 85% down from the peak. The points on the sine-wave indicate the maximum and minimum values of voltage for the percentages of modulation, corresponding to the $P_L$ contours of Fig. 7. The curves are numbered to correspond to the paths of Fig. 7. Since the R. F. phase angle is zero only when $\phi=\phi'$ is zero, the phase angle at carrier level is zero only for path "3," see point A in Fig. 7. The phase angles were not calculated for path "1" since the required frequency contour does not intercept the peak $P_L$ contour (+85%) in Fig. 7. The system would break out of lock at the peak of the cycle and the phase angle would be meaningless. For each path, the total phase modulation is the peak-to-peak difference in $\theta$ in Fig. 8.

Figure 8:
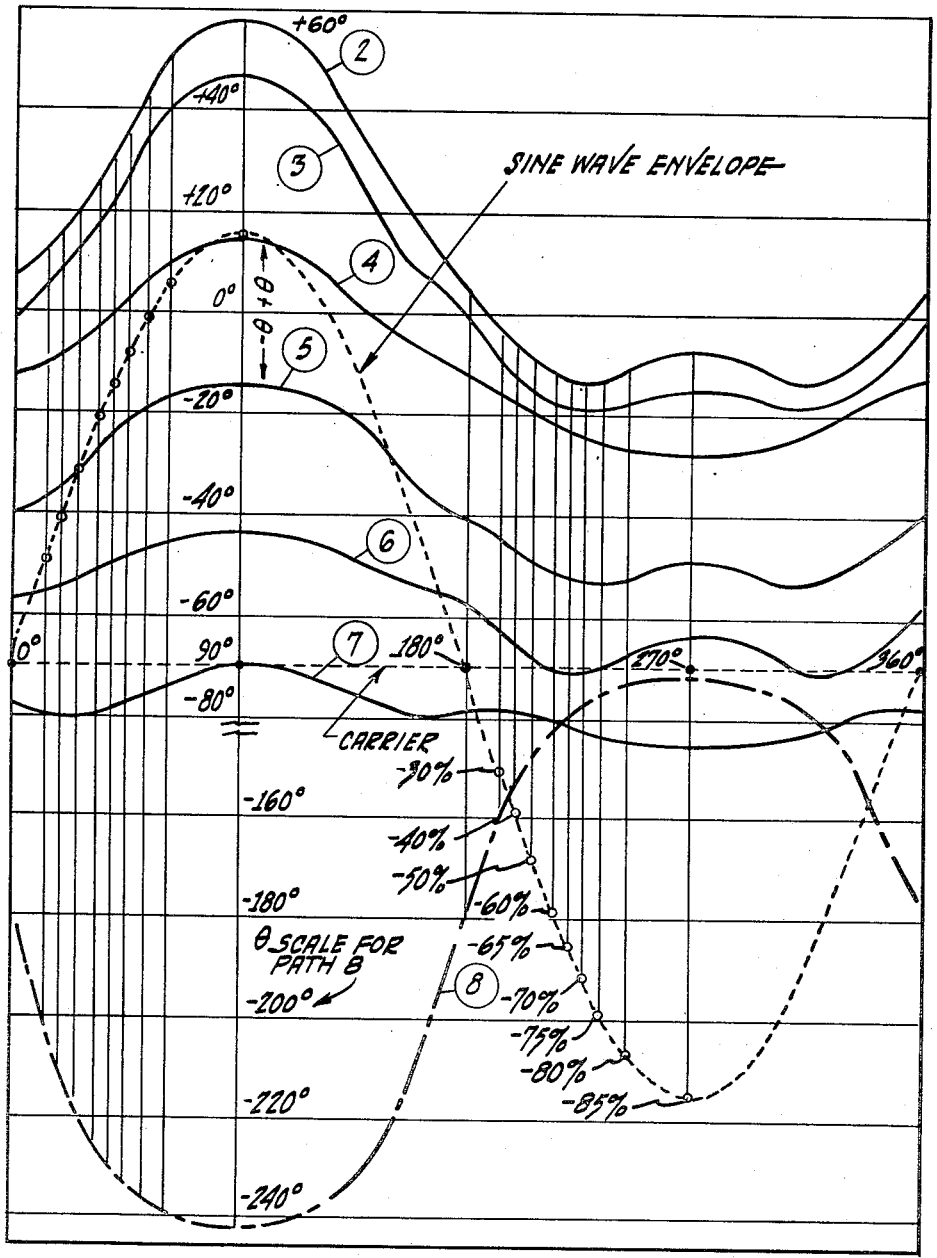
Fig. 8 is a plot of phase modulations for the various loci of Fig. 7.

In Fig. 8, it will be noted that several of the curves (2, 3, 5 and 6) fold back to show a decrease in phase modulation at the bottom of the cycle (−85% modulation). Several show a flattening at either or both ends. The degree of fold-back varies with system adjustments that change either the impedance presented to the magnetron at carrier level or the depth of modulation.

For each of the paths of Fig. 7, successive values of R. F. phase angle $\theta$ were determined, by the use of the vector diagram of Fig. 5. The angle $\theta$ found is the phase angle, at the junction 5, between the radio frequency voltage and the injected current, I. Since the same changes in this angle occur at the load 3, and since the current I is made constant in phase (by the circuit of Fig. 1) with respect to the grid drive of the locking amplifier, the curves of Fig. 8 give the total radio frequency phase modulation of the voltage across the load during the modulation cycle.

From an examination of Fig. 8, it may be seen that the phase modulation, for the depth of modulation (85%) used in television practice, varied from a total of 15° (for path 7) to about 120° (for path 8), or ±7.5° to ±60°, depending upon the starting point of the partciular path of Fig. 7, since it is the starting point (carrier level) for each locus in Fig. 7, which determines the position of such locus on the Fig. 7 chart. As previously discussed, the adjustment of the position of the magnetron tuner determines the starting point of each of the numbered operating point loci in Fig. 7, and, since the total phase modulation varies for the various paths or loci (as can be seen from Fig. 8), a proper adjustment of the magnetron tuner can give a path, in Fig. 7, which makes the phase modulation a minimum. In other words, the phase modulation, during the amplitude modulation cycle, of the injection-locked magnetron is a sensitive function of the position of the magnetron tuner. For a given injection current, proper adjustment of the tuner gives a minimum phase modulation.

As a result of the analysis previously given, the complex reflection coefficient at the junction is known for each point in the modulation cycle, the values of this coefficient being given by matched values of $|\rho|$ and $\phi$ for various points along the numbered loci in Fig. 7. The power output of the locking amplifier can be calculated, throughout the modulation cycle, from Equation 16. The power output of the docking amplifier is variable during the modulation cycle and reaches a maximum at the top of the cycle. If this maximum exceeds the available output of the amplifier, the phase modulation would increase. $P_{LA}$ is different for every point on a $P_L$ contour, although the power in the load si of course the same for all points on any one $P_L$ contour. Since the required locking power varies for each of the numbered loci in Fig. 7, it can be stated that the required locking power is a sensitive function of the position of the magnetron tuner. For a given injection current, proper adjustment of the tuner given a minimum phase modulation and the required injection power is a function of the position of the tuner. Also, from Equation 16, it may be seen that the required locking power is a function of the magnitude of the locking current, I.

We will now consider the effect, on the total phase modulation, of increasing the locking current, I. For the foregoing analysis, it has been assumed that the injection current, I, is one ampere during the whole cycle. Now let it be assumed that I is two amperes during the whole cycle. The $P_L$ contours will all lie at larger values of $|\rho|$, since Equation 15 shows that $P_L$ varies directly as $I^2$. By a similar process of plotting paths as used for Fig. 7, the values of $\phi$ are determined as for Fig. 7 and the values $\theta$ from Fig. 5. When this is done, it was found that for a few paths the phase modulation reverses in phase with respect to the amplitude modulation, as was the case in Fig. 8. It is found that the peak-to-peak values of phase modulation are, on the average, decreased when the injection current is increased. Therefore, the phase modulation is a function of the magnitude of the locking current. A large increase in pushing (Fig. 6) would cause the system to break synchronism for all possible one-ampere paths of Fig. 7. Thus, a total pushing of more than 8 mc. from the maximum $P_L$ to the minimum $P_L$ would exceed the range given between the lowest frequency contour intercepted by the maximum $P_L$ contour and the highest frequency contour intercepted by the minimum $P_L$ contour. If the $P_L$ contour fails to intercept the desired frequency contour in any case, breakout results. In the two-ampere case, however, the range just referred to is approximately 15 mc. This means that a magnetron of nearly twice the pushing could be locked by two amperes. Adjustment of the injection current thus prevents breaking of synchronization.

Adjustment of the magnetron tuner and of the injection current in combination prevents breakout and gives the optimum combination, depending upon system requirements, of low phase modulation and low locking power.

For putting the circuit of Fig. 1 into operation, with a matched passive load 3 and with $l=n\lambda/2$, the unlocked magnetron is tuned to the locking frequency or slightly above. The amplifier tank 9 is tuned near resonance and the magnetron is locked. A reasonably high percentage modulation is applied to the magnetron and the tank 9 is tuned off resonance slowly. The phase modulation is measured as the tank is tuned until breakout occurs. The minimum phase modulation is noted. Breakout may occur very soon for this magnetron tuner setting.

The magnetron tuner is then adjusted in the direction such as to reduce the frequency of the unlocked magnetron and the process is repeated. Some adjustment of the tuner combined with some adjustment of tank tuning will give a minimum phase modulation. This is the best performance that can be obtained with the locking amplifier used and with the restrictions placed upon the passive load and the line length.

From the vector diagram of Fig. 5, the radio frequency phase angle $\theta$, would always be zero, and therefore constant, if $\phi=\phi'$ were always zero. The path would then have to be down the zero reactance line (vertical line) of Fig. 7, however, and operation at the minimum $P_L$ could not occur on a frequency contour much higher than the contour for the peak of the cycle. The pushing would have to be extremely low, or the locking current extremely high, to give locking over the modulation cycle. Thus, with a line length $l$ (Fig. 1) of $n\lambda/2$ between the magnetron reference plane 4 and the junction 5, zero phase modulation cannot be obtained conveniently when the path of operation is restricted to a straight line.

*Effect of altering line length, one-loop case*

Figure 9:
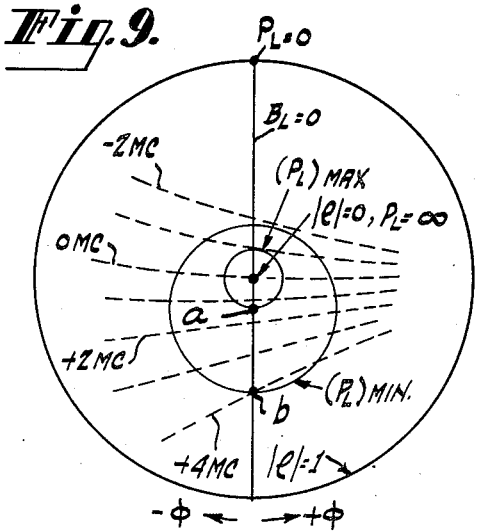
Figs. 9 and 10 are junction admittance charts for two different adjustments of the circuit of Fig. 1.

The situation is quite different if the line length $l$ between the magnetron and the junction is altered. Fig. 9 is a plot of the admittance at the junction 5, with the junction $\frac{3}{8}\lambda$ from the magnetron, with superimposed $P_L$ contours. In other words, for Fig. 9, $l$ (circuit of Fig. 1) is $\frac{3}{8}\lambda$.

In this connection it may be noted that the diagram of Fig. 7 (Rieke diagram with superimposed $P_L$ contours and loci of operating points) may be considered to be applicable at either the magnetron reference plane 4 or at the plane of junction 5, since for Fig. 7 the junction 5 was considered to be an integral number of half-wavelengths from the magnetron plane 4. Thus, Fig. 7 is a plot of the admittance at the junction 5, with the junction $n\lambda/2$ from the magnetron plane 4, with superimposed $P_L$ contours.

The $P_L$ contours are unchanged in Fig. 9 (with respect to their positions in Fig. 7), since Equation 15 gives $P_L$ in terms of $|\rho|$ and $\phi'$ at the junction. However, the frequency contours (represented by the dotted curves in Fig. 9), plotted on the chart of junction admittances, are rotated clockwise 90° as shown (that is, they are rotated with respect to their positions in Fig. 7). The path of operating points $a$—$b$, from maximum or peak to minimum $P_L$, now gives zero phase modulation, since $\phi$ (and therefore $\theta$) are now always zero in Fig. 5. In Fig. 9, operation at the minimum $P_L$ can occur on a frequency contour substantially higher than the contour for the maximum $P_L$, since in this figure the frequency contours run at approximately right angles to the line of symmetry for the $P_L$ contours.

Thus, it may be seen that the line length ($l$ in Fig. 1) between the magnetron reference plane 4 and the junction 5, although it has no influence on the positions of the $P_L=0$ and $P_L=\infty$ points on the admittance chart at the junction and no influence on the contours of constant $P_L$ on this chart, does determine the orientation of the frequency contours on the chart, as shown in Fig. 9. This is an important new degree of freedom. In connection with Fig. 7, only the position of the magnetron tuner and the value of locking current could be changed in an effort to get minimum phase modulation. The addition of the line length adjustment allows the paths of operation to be more closely fitted to a path of zero phase modulation. By adjusting the length of line $l$ (Fig. 9) to other values than that applying to Fig. 9, the frequency contours may be oriented to still other directions, with respect to the $P_L$ contours. Proper adjustment of line $l$ results in an optimum orientation of the frequency contours, plotted on the admittance chart at the junction, with respect to the contours of power in the load. Therefore, by the adjustment of a line length, of the position of the magnetron tuner, and of the injection current, a greatly decreased (substantially zero) phase modulation can be obtained, together with the minimum injection power possible for such a case. This means that the smallest possible injection amplifier can be used, consistent with very low phase modulation.

In Fig. 9, just as in Fig. 7, the paths of operating points pass through successive contours of constant $P_L$, at points on these contours determined by their intersections with the frequency contours required for locking.

In connection with Fig. 9, if the magnetron tuner is adjusted so that point $a$ is on the zero-susceptance line for a given I of Equation 15, the magnetron pushing for the peak-to-minimum power swing would have to be exactly right to make the minimum $P_L$ contour intersect the proper frequency contour on the $B_L=0$ line at point $b$. The coupling to the magnetron could be altered to change the effective spread of the frequency contours to match the pushing, or the locking current could be changed to alter the position of the $P_L$ contours and thus alter the effective frequency contour spread. Also, as will be explained further hereinafter, mismatch of the load can be used to alter the effective spread of the frequency contours.

The simple case of Fig. 9 will be considered in one other respect, that of locking power. Equation 16 gives an expression for the locking power, $P_{LA}$. For a path down the zero-susceptance line of Fig. 9, $\cos \phi'$ is unity. For zero phase modulation between end points the difference of frequencies corresponding to the contours through points $a$ and $b$ must equal the pushing. If the contours are widely spread, the values of $|\rho|$, to reach points $a$ and $b$, are large. However, large values of $|\rho|$ mean that, for the same values of $P_L$, large values of I must be used, from (15), and large values of I mean large values of $P_{LA}$ from (16). The required maximum output of the locking amplifier, which occurs at the top of the amplitude modulation cycle, will be reduced, for the same pushing, if the frequency contours can be moved closer together, since in this case the values of $|\rho|$ will not be as great. The crowding of the contours results in a reduction, successively, of $|\rho|$, I and $P_{LA}$.

The desired crowding of the frequency contours can be produced by increasing the load conductance presented to the magnetron. An increase in coupling coefficient would have accomplished the decrease in locking power in the case of Fig. 9, but the coupling coefficient is not easily adjusted. Mismatching the passive load 3 (Fig. 1) at the end of the transmission line 2, in addition to changing the line length $l$ between the magnetron and the junction, will now be shown to provide low phase modulation and reduced locking power.

For the special case (Fig. 7) of the passive load matched to the line and $l=n\lambda/2$, the points on the chart for $P_L=0$ and $P_L=\infty$ are found in the following manner. $P_L$ is given by (15) in terms of $|\rho|$ and $\phi=\phi'$ at the junction. From (15), it may be seen that $P_L=\infty$ when $|\rho|=0$, that is, when the total effective load (evaluated at the junction) presented to the magnetron is equal to the passive load on the end of the transmission line. This result would be expected since $P_L=\infty$ would require a magnetron output of infinity and the locking amplifier would make a negligible contribution to the total load. The $P_L=\infty$ point is indicated on Fig. 7.

In this special case of $Y_L=Y_0$, $P_L$ is zero when the numerator of (15) is zero, or $$|\rho| = -\cos \phi' \pm \sqrt{\cos^2 \phi' - 1} \qquad (18)$$

Since $|\rho|$ must be real and positive, inspection of (18) shows that $P_L=0$ when $|\rho|=1$ and $\phi'=180°$. Thus, if the power in the load could be modulated to zero, the magnetron would see a short circuit and would, in turn, present a short circuit to the junction, shorting the load. The $P_L=0$ point is indicated on Fig. 7.

Since Equation 15, giving $P_L$, applies also to Fig. 9, the $P_L=0$ and $P_L=\infty$ points are similarly located on the admittance diagram of Fig. 9.

The two points in question lie on the $B_L=0$ line in Figs. 7 and 9. For $Y_L=Y_0$, it has already been explained that when the path of operating points lies on the $B_L=0$ line, the phase modulation is zero.

The problem is now to make the path of operating points lie on the straight line defined by $P_L=0$ and $P_L=\infty$, on the admittance chart at the junction, so that the simplest case of zero phase modulation is realized. The radio frequency phase modulation will be zero if the path of operating points lies on the straight line just referred to; this is the simplest path for zero phase modulation. However, there are an infinite number of curves passing through the $P_L=0$ and $P_L=\infty$ points, giving zero phase modulation.

*Effect of mismatching load, one-loop case*

Figure 10:
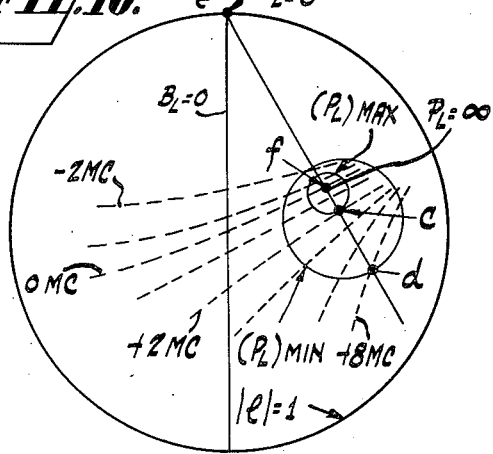

In addition, operation in a region of crowded frequency contours is desired, to reduce the required locking power. Assume that the load, and the line length $h$ from the load 3 to the junction 5 of Fig. 1, are such that the admittance presented at the junction 5 by the passive load 3 is at point $f$ of Fig. 10. Since point $f$ is not at the center of the $|\rho|$ circles or contours, this means that the load is no longer matched, but instead is mismatched, to the transmission line. Fig. 10 is a junction admittance chart for the case of an injection locked magnetron with a mismatched passive load and a line length $l$ somewhat greater than $3/8\lambda$.

Point $f$ will be the operating point for $P_L=\infty$. Point $e$ is the operating point for $P_L=0$, as in Fig. 9. The contours of constant $P_L$ will lie symmetrically about the line $e-f$, just as they lay symmetrically about the line $(B_L=0)$ between $P_L=\infty$ and $P_L=0$ in Figs. 7 and 9. Now let the line length $l$ between the magnetron plane 4 and the junction 5 be adjusted, as an example, to slightly more than $3/8\lambda$, so that the frequency contours of Fig. 7 will be effectively rotated and will plot as shown in Fig. 10. Let the locking current and the magnetron tuner be adjusted so that the operating point at the top of the cycle is at point $c$, on the extension of line $e-f$. The highest frequency contour to be intersected is determined by the pushing and the value of $P_L$ desired at the bottom of the cycle. If the total pushing and the locking current are such that the lowest $P_L$ contour intersects the correct frequency contour at $d$, on the extension of the line $e-f$, there will be no phase change between the top and bottom of the cycle. If the phase changes during intermediate portions of the modulation cycle are low, the total phase modulation will be zero or very low.

To go into slightly greater detail, the locking current and the magnetron tuner are adjusted to give the foregoing result. Suppose the total unlocked-magnetron frequency change is 6 megacycles from the peak to the minimum of the amplitude modulation cycle. The locking current, I, determines the size of the $P_L$ contours, just as it did in the matched load case for which $P_L$ was given by Equation 15. Therefore, the distances $f-c$ and $f-d$ are also determined. The current, I, and the tuner are adjusted together until $d$ is on a frequency contour 6 mc. above the contour at $c$.

From a comparison of Figs. 9 and 10, it may be seen that, by properly choosing the value of the passive load, relative to the characteristic impedance of the transmission line, operation may be made to take place in a region of the chart in which the frequency contours are closer together. Thus, another degree of freedom is added to the system.

Even in the matched load case of Fig. 9 the phase moduation was low. While it may be lower for the mismatched load of Fig. 10, due to the shorter path $c-d$, the more important advantage of the mismatched load is a possible reduction in locking power. Due to operation in a region of the chart in which the frequency contours are closer together, the $P_L$ contours may be smaller.

The locking current and locking power are thus greatly reduced, since, as previously explained, the crowding of the contours results in a reduction of $|\rho|$, I and $P_{LA}$.

The decrease in locking power arising from the use of a mismatched load depends upon a very important assumption. This assumption is that the magnetron pushing is not greatly increased by the increased load conductance presented to the magnetron. When "longline" effects are eliminated by the locking of the magnetron, pushing has in some cases been found to vary less rapidly than the loaded Q with load conductance. For these cases it would be expected to vary less rapidly than the crowding of the frequency contours and a net gain in locking power would be expected, therefore, from the use of mismatched loads. In other words, by mismatched loads, there may be had a large decrease in the size of the required locking amplifier, in the case of magnetrons for which the pushing does not increase rapidly with load conductance.

The system so far described has the property that there are many possible ways in which zero phase modulation can be achieved. These can be represented by curves on the admittance chart at the junction. For each possible adjustment of locking current, magnetron tuner, load and line length, a path of zero phase modulation may or may not be followed, but an optimum combination of these adjustments does give very low or substantially zero phase modulation.

When the system has been tested and used to the extent where the degree of mismatch of passive load has been definitely chosen, the voltage standing wave ratio (VSWR) in the line to the passive load can be reduced by changing the coupling coefficient of the magnetron loop in this line. For any type of operation a high conductance load on the end of a 50-ohm line, for example, would give a high VSWR. The magnetron would see the same load if the load conductance were reduced to unity (normalized) and the coupling coefficient were increased. In other words, if a mismatched passive load is found to give the best combination of phase modulation and locking power, the proper adjustment of the coupling coefficient of the magnetron loop can reduce the VSWR in the line, and thus greatly improve the conditions under which the magnetron seal operates, yet give the same system performance.

Figure 11:
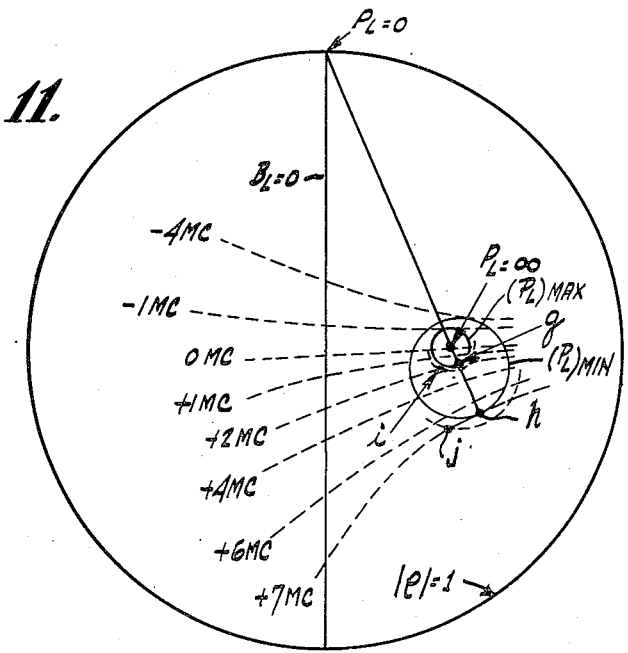
Fig. 11 is a chart similar to Fig. 10 but illustrating another adjustment.

Reference has been made hereinbefore to variation of the injection current or locking current to provide increased stability, or to prevent breaking of synchronization of the magnetron. This will now be explained in somewhat more detail, by reference to Fig. 11. Fig. 11 is a junction admittance chart somewhat similar to that of Fig. 10, for a mismatched load and for a line length $l$ not equal to an integral number of half-wavelengths. For Fig. 11, the passive load has been adjusted to place the $P_L = \infty$ points as illustrated. $P_L = 0$ always occurs at $|\rho| = 1/180°$. The length, $l$, has been adjusted to rotate the frequency contours as shown, on the junction chart.

Let it be assumed that the pushing is 5 mc. from the top to the bottom of the desired modulation cycle. If the operating points for $P_{max}$ and $P_{min}$ are to lie on the $P_0$–$P_\infty$ line, the locking current must be adjusted until the $P_L$ contours for $P_{max}$ and $P_{min}$ intersect the $P_0$–$P_\infty$ line at frequency contours separated by 5 mc. This is assumed to have been done in Fig. 11, with the points of intersection being at $g$ and $h$.

It should be noted that the equalization of the radio frequency phase angles at the maximum and minimum points in the cycle does not mean that the phase modulation will be zero throughout the cycle. Successive power levels in the load give $P_L$ contours between those of Fig. 11. Each new power level corresponds to a new anode current and a change in frequency of the unlocked tube. Operation takes place on the chart at the intersection of the $P_L$ contour with the frequency contour required for correction. The points of operation for intermediate power levels may lie off the $P_0$–$P_\infty$ line, in which case the phase modulation will have harmonic components. On the other hand, there may be no point of intersection of the $P_L$ contour with the required frequency contour, in which case the system will break synchronism at intermediate points in the cycle.

With the end points $g$ and $h$ of Fig. 11, a slight decrease in frequency, due to a change in temperature, for example, would break synchronism at either end of the cycle, since the $P_L$ contour would no longer intersect the proper frequency contour. The adjustment is too delicate. One way to obtain stability would be to increase the locking current slightly (thus enlarging the $P_L$ contours), so that for the same power levels and the same tuner setting the end points of operation shift to $i$ and $j$. Then, if the frequency decreases slightly, the $P_L$ contour still intersects the proper frequency contour and synchronism is not broken.

As has previously been stated, there are an infinite number of curves passing through the $P_L = 0$ and $P_L = \infty$ points, giving zero phase modulation. In other words, has been stated, the system phase modulation is zero if the path of operating points can be made to lie along the straight line between $P_L = 0$ and $P_L = \infty$, or along a family of circles passing through $P_L = 0$ and $P_L = \infty$. Thus, for the matched-load, $l = \lambda/2$ case of Fig. 7, the zero-phase-modulation paths can be represented by the $B_L = 0$ line (which passes through the $P_L = 0$ and $P_L = \infty$ points), and a family of circles passing through $P_L = 0$ and $P_L = \infty$.

For the general one loop magnetron case of Fig. 10 (mismatched load and $l = \lambda/2$), the $P_L = 0$ and $P_L = \infty$ points are as indicated in Fig. 10. The zero-phase-modulation paths (straight line between $P_L = 0$ and $P_L = \infty$, and a family of circles passing through $P_L = 0$ and $P_L = \infty$) for the general one-loop case are shown in Fig. 18, which also shows in dotted lines two frequency contours for the general one-loop case of Figs. 1 and 10. The curves (specifically, circles) passing through $P_L = 0$ and $P_L = \infty$ may be termed "equal-phase curves."

Point $j$, Fig. 11, for an increase in locking current to prevent end-point instability, can be made to lie on, or very near to, the equal-phase curve through point $i$. There are two qualitative reasons for the result. First, a change in locking current increases the size of the low-power $P_L$ contour more than it increases the size of the high-power $P_L$ contour. Thus, the point $j$ moves more on the chart than the point $i$. Second, adjustment of the magnetron tuner moves both points $i$ and $j$ along their $P_L$ contours, but by more nearly the same amount. Adjustment of both injection current and the tuner then affords movement of $j$ relative to the movement of $i$, so that the end points can, in general, be adjusted to lie on or near to one of the constant-phase curves. This makes the phase modulation zero for the end points.

It has previously been pointed out that zero phase modulation is obtained if the path of operation is along a family or multiplicity of curves, including a straight line, through the $P_L = 0$ and $P_L = \infty$ points. This is true for any of the circuit arrangements, including the matched-load, $l = n\lambda/2$, case described in the first part of the present specification. The required locking power, for any circuit arrangement, is a maximum near the top of the cycle and this maximum value is highest for paths of operation near the $P_L = 0$ to $P_L = \infty$ straight line. For any such path, however, the required locking power would be reduced, if the pushing were unchanged, by working in a region of the admittance chart in which the frequency contours are more crowded.

From the foregoing, the use of mismatched loads may permit the use of a smaller locking amplifier. Also, variation of load and line length permits rotation of the frequency contours with respect to the line through $P_L = 0$ and $P_L = \infty$. It will now be shown that the new degrees of freedom introduced, by variation of load and line length, will result in less phase modulation, for the average Rieke diagram, than the original circuit, with matched load and $l=n\lambda/2$.

For Fig. 7, the representative Rieke diagram of an A-128 magnetron was used. It was found that the minimum obtainable phase modulation was about ±7.5° for 85% modulation from a peak power of about 1 kw. The calculated value of ±7.5° will be accepted for present purposes, since it should be obtainable with the particular pushing and Rieke diagram assumed.

If the frequency contours are rotated on Fig. 7, to simulate the generalized case (line length $l$ different from $n\lambda/2$, the ±7.5° of phase modulation can be reduced to substantially zero (as explained in connection with Fig. 9), whether or not the load is mismatched (as in Fig. 10) to reduce the locking power. It is of decided interest to consider what would happen if the Rieke diagram were altered to a substantial degree.

One-loop case, modified Rieke diagram

Figure 12:
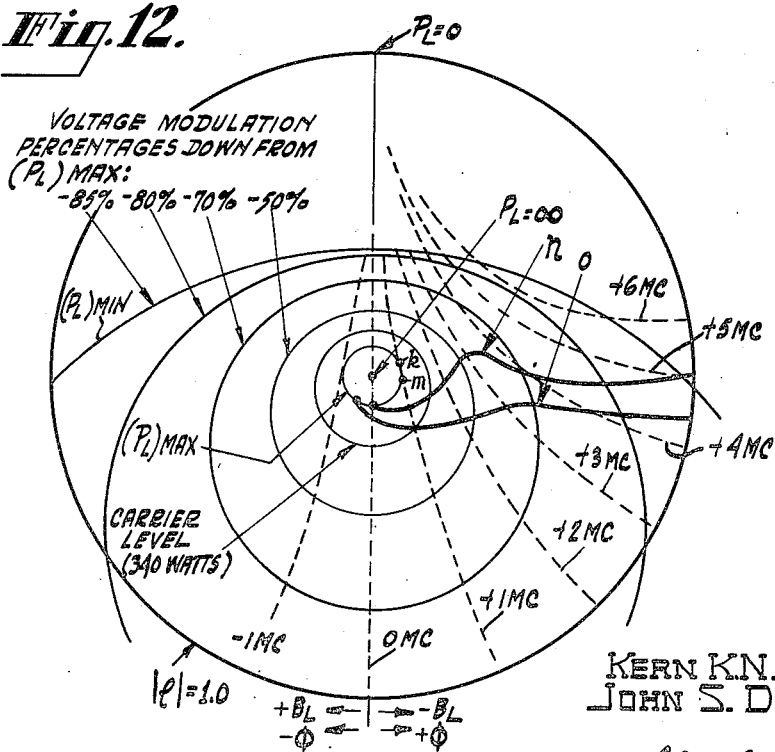
Fig. 12 is a chart similar to Fig. 7, but using a different Rieke diagram.

To obtain a fundamentally different Rieke diagram it was assumed that the frequency contours are parallel to the $B_L$ contours of the Smith chart (see "Transmission-line calculator," P. H. Smith, Electronics, vol. 12, pp. 29–31, January 1939), that $B_L=0$ is the 0-mc. contour, $B_L=1.0$ is the +5 mc. contour and that the change in frequency is a linear function of $B_L$. The circuit of Fig. 1 is assumed (matched load, $l=n\lambda/2$), with a locking current of one ampere and a carrier level of 340 watts, as in Fig. 7. The $P_L$ contours of Fig. 7, derived as previously explained, were superimposed on the Smith chart to give Fig. 12. Fig. 12, then, is a new Rieke diagram with superimposed $P_L$ contours (and also superimposed paths of operation) for the "one-loop" circuit of Fig. 1, with matched load and $l=n\lambda/2$. Portions of the "—80%" and "—85%" $P_L$ contours are omitted from Fig. 12, for simplicity.

Figure 6:
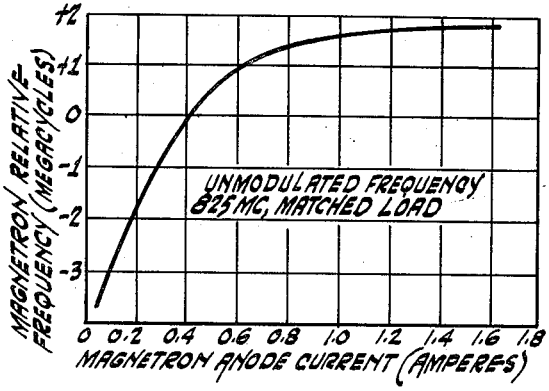
Fig. 6 is a dynamic pushing curve for a magnetron.

Using the pushing curve of Fig. 6, the paths of operation for several starting points on the $P_{max}$ contour were calculated. The paths starting near points $k$ and $m$, which were the paths of minimum phase modulation for the frequency contours of Fig. 7, resulted in breakout during portions of the cycle. Paths $n$ and $o$ gave locked operation throughout but the phase modulation was very high, about ±30° for path $n$ and ±45° for path $o$. All other possible paths gave breakout or even greater phase modulation.

There are only two variables which may be adjusted when the load is matched and $l=n\lambda/2$. The optimum setting of the first variable, the tuner adjustment, gave the very high phase modulation described in the preceding paragraph. In addition, the required locking power was in the neighborhood of 250 watts. Adjustment of the second variable, the locking current, appears to give only slight improvement in phase modulation at the expense of still higher locking power. In summary, the Fig. 1 circuit, with matched load and a length $l$ of an integral number of half-wavelengths, gives very poor results for the Rieke diagram of Fig. 12. It is true that the Rieke of Fig. 12 is purely theoretical and imposes a very severe test on the procedure. However, for intermediate Rieke diagrams the phase modulation would be progressively worse than that for the diagram of Fig. 7.

The freedom to rotate the frequency contours, by a change in line length, decreases the phase modulation. As mentioned previously, the minimum phase modulation of ±7.5° found with Fig. 7 would be reduced to substantially zero. The Rieke diagram of Fig. 12, which gave very poor results for $l=n\lambda/2$, is used again in Fig. 13. Here, however, the line length $l$ is varied, as represented by the rotation of the frequency contours. For the contour position illustrated (center line of frequency contours having the position shown) the starting point $p$ gave the path of operation $q$. This path lies almost exactly on a curve of zero phase modulation (curved path through the $P_L=0$ and $P_L=\infty$ points).

For another position of the frequency contours, obtained by still another value of line length $l$ (and represented by the "center line of frequency contours for curve $r$"), the starting point $s$, between $t$, on the straight line through $P_L=0$ and $P_L=\infty$, and point $p$, gives almost zero phase modulation.

For the frequency contours completely illustrated, the maximum required locking power decreases progressively as the initial point of the path moves away from point $t$. For starting points counterclockwise beyond $p$, however, breakout occurred during the cycle. The optimum point $p$ gave zero phase modulation with a maximum required locking power, at the top of the cycle, of 200 watts. The curve for starting point $s$ required 250 watts.

The locking power referred to is rather high, about 20% of the peak system output. This is the penalty paid for a very unadvantageous Rieke. Nevertheless, there is a very great improvement in performance as regards phase modulation, compared to that found for Fig. 12, in which the line length was restricted to $l=n\lambda/2$. For Rieke diagrams intermediate between those of Figs. 7 and 12 the freedom to change the line length $l$ would result, in every case, in an improvement in performance. It should be added that there is little reason to expect that practical Rieke diagrams will impose the severe requirements of the theoretical diagram of Figs. 12 and 13.

The circuit of Fig. 1, and the description of the invention up to this point, have been concerned with a "one-loop" magnetron (i. e., a magnetron having only one coupling loop), in which the passive load is coupled to the single loop of the magnetron and wherein the locking current is injected into the transmission line between the magnetron and the load. This injection control system for "one-loop" magnetrons is broadly disclosed and claimed in the aforementioned Koros application, Serial No. 177,455.

Two-loop magnetron circuit

In the copending Koros application, Serial No. 256,096, filed November 13, 1951, an injection locking system for a "two-loop" magnetron (i. e., one having two coupling loops) is broadly disclosed and claimed. In the last-mentioned application, one loop couples the magnetron to a passive load by means of a transmission line, while the injection current or locking current is applied to the other loop, through the agency of a separate transmission line.

Figure 14:
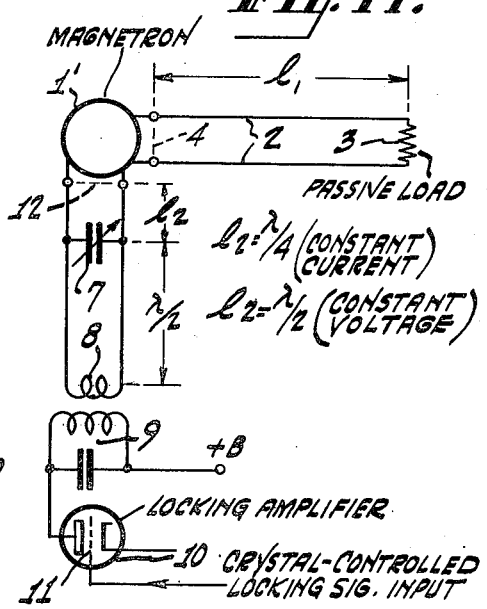
Fig. 14 is a schematic diagram of a two-loop injection locking circuit.

Fig. 14 is a schematic diagram of an injection locking system with a two-loop magnetron, according to this invention. In Fig. 14, elements the same as those of Fig. 1 are denoted by the same reference numerals. In Fig. 14, the load 3 is coupled to one of the coupling loops of two-loop magnetron 1' by means of a transmission line 2, and the distance $l_1$ from the magnetron reference plane 4 to the load 3 may be a half-wavelength or an integral multiple thereof, but this is not absolutely necessary, since it is the load actually presented to the magnetron which is of importance, as will become apparent hereinafter. The voltage across capacitor 7 is derived from the locking amplifier by means of coupling 8. This voltage is constant in amplitude, as shown by Equation 9 above. This voltage is also constant in phase, as previously described with reference to Equations 8, 9, 10 and 11. Capacitor 7 is positioned a distance $l_2$ from the second reference plane 12 of the magnetron 1', and the voltage across capacitor 7 is in effect injected directly into said magnetron by means of its second coupling loop.

Since the voltage across capacitor 7 is constant, if the line $l_2$ is $\lambda/4$ the current injected at the second magnetron loop is constant, while if $l_2$ is $\lambda/2$ the voltage injected at the second magnetron loop is constant. It will be remembered that in the one-loop case of Fig. 1 the current injected at the junction 5 is constant. Comparing Figs. 1 and 14, it may be seen that constant-current control in Fig. 14 can be accomplished by the circuit of Fig. 1, since in Fig. 1 the distance between capacitor 7 and junction 5 (corresponding to distance $l_2$ in Fig. 14) is $\lambda/4$, and in Fig. 1 the injected current is constant. Constant-voltage control in Fig. 14 can be accomplished by changing the circuit of Fig. 1 as regards one line length, $l_2$, the change being from $\lambda/4$ to $\lambda/2$.

In the preceding part of the present specification, Rieke diagrams were used, the frequency contours being plotted on the admittance chart at the junction. The paths of operating points were determined by loads lying on successive frequency contours. The phase modulation and the locking power were uniquely determined by the path of operating points on the Rieke diagram.

A schematic diagram of the equivalent two-loop circuit is given in Fig. 15. $L_{11}$ and $C_1$ are the constants of the magnetron tank circuit. The locking source injects a current $I_3$ at the coupling loop used for locking. The complex passive load presented at the magnetron is $y_{L2}$. For simplicity the reactances and coupling coefficients of the two loops are assumed equal, so that the two mutual inductances are the same. Since the loops are in separate cavities, they are assumed to have no direct coupling between them. $I_1$ is the radio frequency current in the magnetron tank circuit and $V_1$ is the radio frequency voltage across this circuit.

If the Rieke diagram were not used in the manner to be described hereinafter, a very complicated procedure would be necessary to determine the locking power and the phase modulation.

The equivalent Rieke diagram for the two-loop system is obtained in the following manner. Both the current $I_3$ in the loop used for locking and the value of the passive load $y_{L2}$ determine, in combination, the primary current and voltage $I_1$ and $V_1$, for any power in the passive load. $I_1$ and $V_1$ vary during the modulation cycle as the power in the load is varied while synchronism is maintained. For a given $I_3$ and $y_{L2}$ and for a specified power in the load, there are unique values of $I_1$, $V_1$ and of their relative phase. However, it has been found, upon circuit analysis, that each pair of values $I_1$ and $V_1$ can be produced by a complex load, $y_{L1}$, presented at one only, of the two loops. Since this $y_{L1}$ produces the same $I_1$ and $V_1$ as would $I_3$, $y_{L2}$ and $P_L$ in the two-loop case, contours of the two-loop $P_L$ can be drawn on the admittance chart showing the equivalent $y_{L1}$. The positions of these contours will be a function of $I_3$, $y_{L2}$ and the circuit parameters.

As the magnetron anode voltage is varied, the electronic susceptance is altered. This must be corrected by introducing a correcting susceptance. The Rieke diagram taken on the load loop, with the other loop presenting an open circuit at the magnetron plane, gives the load susceptances which must be presented at that loop if the frequency is to be corrected. The one-loop Rieke diagram is used as a measure of the external susceptances needed. The $P_{L2}$ contours (contours of the two-loop $P_L$) can be drawn on the one-loop diagram, however, as described in the preceding paragraph. If a point of operation is chosen at the intersection of the $P_{L2}$ contour and the required frequency contour, as determined from the pushing curve, the equivalent load $y_{L1}$ will give the same $I_1$ and $V_1$ which would be given by $I_3$, $y_{L2}$ and $P_{L2}$ in the two-loop case. But the same $I_1$ and $V_1$ at the same relative phase angle will present the same susceptance internally as does the $y_{L1}$. Therefore, the frequency is corrected. The path on the chart of $y_{L1}$ can be used to determine the variations in phase between the voltage across the load, $y_{L2}$, in the two-loop case and the injection current, $I_3$. This gives the system phase modulation.

Thus, the one-to-one correspondence between $y_{L1}$ and the two-loop parameters $I_3$, $y_{L2}$ and $P_{L2}$ makes the one-loop Rieke diagram a useful tool for the calculation of two-loop performance. It has been found, therefore, that the presence of a passive load at one loop of the magnetron, and the presence of constant-current or constant-voltage from an injection or locking amplifier at the other loop, gives a result which can be presented on a Rieke diagram taken on one loop, only, of the magnetron. The contours of load power and the paths of operation may be plotted on this diagram, so that the phase modulation and locking power can be determined.

By an analysis of the circuit of Fig. 14, it is found that, for the constant-current case ($l_2=\lambda/4$), the $P_L=\infty$ point occurs at a point on the admittance chart corresponding to the passive load, $y_{L2}$ (Fig. 15). In the constant-voltage case, however, the position of the $P_L=\infty$ point is a function of both the passive load and $\varpi L_{22}$, that is, this point is at a location quite different from the point corresponding to $y_{L2}$.

The $P_L=0$ point is the same for both the constant-current and the constant-voltage two-loop cases. This point is on the $|\rho|=1$ circle (the outer edge of the admittance chart), but the position of this point on said circle is a function of $\varpi Y_0 L_{22}$ (Fig. 15). Thus, this point can be moved around the edge of the chart depending upon $L_{22}$ or $Y_0$.

It can be shown that, in either the constant-current or constant-voltage two-loop case, the contours for $P_L$ (other than zero or infinity) are circles lying on the straight line connecting $P_L=\infty$ and $P_L=0$.

Possible positions of the $P_L=\infty$ and $P_L=0$ points, with representative $P_L$ contours, are shown in Fig. 16 for either the constant-current or constant-voltage two-loop cases. As in Fig. 7, the $P_L$ contours normally used center around the $P_L=\infty$ point, although for very low values of $P_L$ their center shifts to the $P_L=0$ point.

Effect of mismatched load, two-loop case

In the constant-current case, the position of the $P_L=\infty$ point is a function of $y_{L2}$ and $Y_0$ and the point can be made to lie at any desired position on the admittance chart. In the constant-voltage case, the position of the $P_L=\infty$ point is a function of $\varpi L_{22}$, in addition to $y_{L2}$ and $Y_0$. In both the constant-current and constant-voltage cases, the position of the $P_L=0$ point is a function of both $Y_0$ and $L_{22}$, the former being the characteristic admittance of the transmission line and the latter being the loop inductance of the loop supplied by the locking amplifier.

Since the frequency contours for the two-loop cases always lie symmetrically about the $B_L=0$ line in Fig. 16 and since the $P_L$ contours are circles symmetrical about the straight line between $P_L=0$ and $P_L=\infty$, the $P_L$ contours can be rotated with respect to the frequency contours by changing the position of the $P_L=\infty$ point on the single-loop admittance chart. As described in the preceding paragraph, the position of the $P_L=\infty$ point for each of the two-loop cases depends upon, among other factors, $y_{L2}$, the passive load presented at the magnetron plane in the two-loop cases. Therefore, the $P_L$ contours (Fig. 16) can be rotated with respect to the frequency contours by adjusting the passive load. This degree of freedom is analogous to that of changing the line length in the one-loop case. Thus, the passive load presented to one loop of the magnetron is a most important parameter. This load can be adjusted to rotate the $P_L$ contours with respect to the frequency contours (as previously explained in connection with Fig. 9, wherein relative rotation between the frequency contours and the $P_L$ contours is effected by changing the line length in the one-loop case), to give minimum phase modulation, combined with minimum locking power.

As previously described, it is possible to change the position of the $P_L=\infty$ point in Fig. 16 by adjustment of the passive load, $y_{L2}$. By correct adjustment of this load, operation may be made to take place in a region of the single-loop admittance chart (Fig. 16) in which the frequency contours are closer together. As previously described in connection with Fig. 10, operation in a region of crowded frequency contours can greatly decrease the required locking power, in the case of magnetrons for which the pushing does not increase too rapidly with increase of load conductance.

It has previously been stated that the position of the $P_L=\infty$ point for the constant-current case is a function of $y_{L2}$ and $Y_0$, while the position of the same point, for the constant-voltage case, is a function, not only of $y_{L2}$ and $Y_0$, but also of $\omega L_{22}$. Thus, for the same load $y_{L2}$ and the same $Y_0$ the $P_L=\infty$ point on the chart is a quite different one in the constant-voltage case from the corresponding point on the chart in the constant-current case, unless $y_{L2}$ is altered. In other words, for the same passive load, the effective loading on the magnetron, due to the passive load plus the output of the locking amplifier, is different, for the constant-voltage case, from the effective loading for constant-current locking. Therefore, in order to get to the same operating point on the chart (and to thereby get the best system performance) the passive load should be adjusted differently in the two cases (viz., in the constant-current and in the constant-voltage cases).

*Effect of changing loop inductance*

For minimum phase modulation and minimum locking power, attention should be paid to both the absolute and relative positions of the points for $P_L=0$ and $P_L=\infty$, on the single-loop admittance chart. For the constant-current case, the $P_L=0$ point (Fig. 16) can be adjusted by changing $L_{22}$. Thus, it can be stated that the choice of the loop inductance $L_{22}$ of the loop supplied by the locking amplifier controls the relative position of the frequency contours and the contours of constant load power on the single-loop admittance chart or Rieke diagram. This orientation, together with the position of the magnetron tuner (which establishes the initial operating point), fixes the path of operation and thus specifies the obtainable phase modulation and the locking power required.

For the constant-current case, the $P_L=\infty$ point can be moved independently by changing $y_{L2}$. $L_{22}$ cannot be changed conveniently, the $P_L=0$ point can be moved on the chart by changing $Y_0$. Although the $P_L=\infty$ point is moved by this, it can be readjusted independently by changing $y_{L2}$.

In the constant-voltage case, if the $P_L=0$ point is moved by changing $L_{22}$ (moving the $P_L=\infty$ point, as well), the $P_L=\infty$ point is then readjusted independently by altering $y_{L2}$. If a change in $Y_0$, alone, is used to move the $P_L=0$ point, the $P_L=\infty$ point is moved independently by a change in $y_{L2}$. Thus, in the constant-voltage case, also, the choice of the loop inductance $L_{22}$ can be said to control the relative position of the frequency contours and the contours of constant load power on the Rieke diagram.

The system phase modulation in the two-loop cases, like that in the one-loop case, is zero if the path of operating points can be made to lie along the straight line between $P_L=0$ and $P_L=\infty$, or along a family of circles passing through $P_L=0$ and $P_L=\infty$. Such a straight line and circles are shown in Fig. 17, which also shows in dotted lines two frequency contours for the two-loop circuit of Fig. 14. From Fig. 17, it may be seen that the frequency contours, for the two-loop cases, always lie symmetrically about the $B_L=0$ line. With the average Rieke diagram, the adjustment of the load in the two-loop cases can cause the actual path of operating points to closely follow one of the zero-phase-modulation paths in Fig. 17. Thus, low phase modulation can be achieved.

In connection with phase modulation, calculations have not shown any significant difference in the predicted phase modulation attainable, for the same locking power, with the one-loop or two-loop magnetrons.

For all systems discussed hereinabove, the locking power required is greatest at the top of the modulation cycle. The maximum power demanded must not exceed the available output of the amplifier. The power required at the top of the cycle is greatest when the path of operating points begins at a point close to the line through $P_L=0$ and $P_L=\infty$. It is desirable, therefore, that the operating points lie along a curve of zero phase modulation and that this curve be one of the circles of small radius of curvature in Fig. 17. For any such path of operating points, however, the required locking power would be reduced, if the pushing were unchanged, by working in a region of the admittance chart in which the frequency contours are more crowded. The importance of the degrees of freedom described in connection with Figs. 9 and 16 should now be apparent.

The required locking powers were found to be identical for the one-loop and the two-loop cases.

From the foregoing, the use of mismatched loads, plus variation in coupling parameters or $Y_0$ in the two-loop case, may permit the use of a smaller locking amplifier. To recapitulate, variation of load, $L_{22}$ and $Y_0$ in the two-loop case, and variation of load and line length in the one-loop case, permit effective rotation of the frequency contours with respect to the line through $P_L=0$ and $P_L=\infty$.

For the one-loop magnetron, even with a matched passive load, the standing wave ratio in the line outside the magnetron varies during the modulation cycle. The standing wave ratio is lowest at the top of the modulation cycle, as shown in Fig. 7, since $|\rho|$ is lowest at this point. If the passive load is mismatched the VSWR may be high even at the top of the cycle, when the power delivered is large. With the two-loop magnetron the VSWR in the line to the passive load differs from unity whenever this load is mismatched, as is usually the case.

In the two-loop case mismatched passive loads may be required, to obtain minimum phase modulation. It is interesting to consider the relative values of VSWR in the line containing the main output seal of the magnetron. For a particular value of load assumed, at the maximum point in the amplitude modulation cycle the VSWR was about 5.8 in the one-loop case and in the two-loop constant-current case. In the two-loop constant-voltage case, however, the passive load has a different value for the same effective load on the magnetron, as previously explained. It is the effective load which is "assumed" hereinabove. For this constant-voltage case, the VSWR at the top of the cycle would be roughly 2.5. Therefore, when mismatched loads are used in order to get best system performance, the two-loop constant-voltage arrangement imposes the least severe requirements on the seal should the latter be near a maximum in the line. In other words, for the two-loop magnetron, constant-voltage locking gives the lowest VSWR for the same effective load presented to the magnetron. Then, constant-voltage locking should be used, since in this case the main magnetron seal would be subjected to less severe conditions.

*Constant-phase locking system*

According to a further aspect of this invention, a constant-phase locking system may be devised, utilizing the circuit of Fig. 1. This modification is represented by the "may be" legends in Fig. 1. For this system, the one-loop circuit of Fig. 1 is adapted for constant-voltage injection at the junction 5. This requires that the $\lambda/4$ line in Fig. 1, between capacitor 7 and junction 5, be changed to a $\lambda/2$ line since, as previously stated, the voltage across capacitor 7 is constant, both in phase and amplitude. Therefore, a constant voltage would appear across the junction 5, a half-wavelength away from capacitor 7. This system, then, would more or less correspond to Fig. 14, with $l_2=\lambda/2$, the constant-voltage case.

The phase of the voltage across the capacitor 7 (and hence across the junction 5, a half-wavelength away) would be constant, independent of its amplitude, if the total load across the locking amplifier is constant. But, the total load across such amplifier is substantially constant, since the impedance of capacitor 7 is very low compared to the other loads in the system. In other words, the circuit characteristics are such that there would be no change of phase between the voltage injected at the junction 5 and the locking amplifier grid excitation, if the power output of the locking amplifier were modulated, that is, if the amplitude of the locking amplifier grid excitation were changed. The magnitude of the voltage at the junction 5 would change but its phase would be constant.

If the locking amplifier were modulated to change the magnitude of the voltage at the junction, modulation of the power of the load 3 would be produced, but this would be inefficient because the magnetron 1 would then be operating inefficiently, that is, it would be operating at full power input all the time. Also, a very large locking amplifier would be needed, to prevent breakout. If the magnetron is anode modulated this changes the radio frequency voltage at the junction 5 and across the load 3. Now, the locking amplifier may be modulated to change the voltage at the junction, supplied by the amplifier alone, according to approximately the same function of time as is followed by the junction voltage supplied by the magnetron. As a result, the overall system efficiency is increased by modulating the magnetron, in addition to modulation of the locking amplifier. In addition, a smaller locking amplifier may be used. Also, there would be no phase modulation of the voltage across the junction and therefore no system phase modulation.

In its simplest terms, then, this aspect of the invention contemplates that the locking-branch circuit of Fig. 1 be adjusted for constant-voltage injection (line length between capacitor 7 and junction 5 being λ/2), so that the system phase modulation is reduced to zero, and that the output of the locking amplifier be modulated to vary the power in the load and accomplish amplitude modulation, and that the output of the magnetron be modulated in such a manner that the voltage produced at the junction by the magnetron independently would be approximately the same function of time as that produced independently by the locking amplifier so that the resultant voltage at the junction produces the desired amplitude modulation and, at the same time, the system efficiency is high and breakout is prevented.

What is claimed is:

1. A frequency stabilizing circuit for magnetrons comprising a magnetron oscillator the frequency of which is to be stabilized, a passive load coupled to the output of said magnetron by means of a main transmission line, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and at its other end to said magnetron, and capacitance means connected across said branch line, said last-named means having a reactance of substantially 1 ohm at the frequency of operation of said oscillator.

2. A circuit in accordance with claim 1, wherein the impedance of said load is unequal to the characteristic impedance of said main line.

3. A circuit in accordance with claim 1, wherein said other end of the branch transmission line is connected to said main line.

4. A circuit in accordance with claim 1, wherein the impedance of said load is equal to the characteristic impedance of said main line.

5. A circuit in accordance with claim 1, wherein said other end of the branch transmission line is connected to said main line, and wherein the impedance of said load is unequal to the characteristic impedance of said main line.

6. A circuit in accordance with claim 1, wherein said other end of the branch transmission line is joined to said main line, and wherein the junction of the main and branch lines is located at a point spaced a distance other than an integral number of half-wavelengths, at the magnetron operating frequency, along the main line, from the magnetron plane.

7. A circuit in accordance with claim 1, wherein the impedance of said load is equal to the characteristic impedance of said main line, wherein said other end of the branch transmission line is joined to said main line, and wherein the junction of the main and branch lines is located at a point spaced an integral number of half-wavelengths, at the magnetron operating frequency, along the main line, from the magnetron plane.

8. A circuit in accordance with claim 1, wherein the impedance of said load is unequal to the characteristic impedance of said main line, wherein said other end of the branch transmission line is joined to said main line, and wherein the junction of the main and branch lines is located at a point spaced an integral number of half-wavelengths, at the magnetron operating frequency, along the main line, from the magnetron plane.

9. A circuit in accordance with claim 1, wherein the impedance of said load is equal to the characteristic impedance of said main line, wherein said other end of the branch transmission line is joined to said main line, and wherein the junction of the main and branch lines is located at a point spaced a distance other than an integral number of half-wavelengths, at the magnetron operating frequency, along the main line, from the magnetron plane.

10. A circuit in accordance with claim 1, wherein the impedance of said load is unequal to the characteristic impedance of said main line, wherein said other end of the branch transmission line is joined to said main line, and wherein the junction of the main and branch lines is located at a point spaced a distance other than an integral number of half-wavelengths, at the magnetron operating frequency, along the main line, from the magnetron plane.

11. A circuit in accordance with claim 1, wherein the impedance of said load is unequal to the characteristic impedance of said main line, wherein said other end of the branch transmission line is joined to said main line, wherein the junction of the main and branch lines is located at a point spaced a distance other than an integral number of half-wavelengths, at the magnetron operating frequency, along the main line, from the magnetron plane, and wherein the said capacitance means is located at a point spaced a distance of a quarter-wavelength, at the magnetron operating frequency, along the branch transmission line, from said junction.

12. A circuit in accordance with claim 1, wherein the magnetron has two coupling loops, wherein the main transmission line extends between one of said loops and said load, wherein the impedance of said load is equal to the characteristic impedance of said main line, and wherein said other end of the branch transmission line is connected to the other of said loops.

13. A circuit in accordance with claim 1, wherein the magnetron has two coupling loops, wherein the main transmission line extends between one of said loops and said load, wherein the impedance of said load is unequal to the characteristic impedance of said main line, and wherein said other end of the branch transmission line is connected to the other of said loops.

14. A circuit in accordance with claim 1, wherein the magnetron has two coupling loops, wherein the main transmission line extends between one of said loops and said load, wherein the impedance of said load is equal to the characteristic impedance of said main line, wherein said other end of the branch transmission line is connected to the other of said loops, and wherein the said capacitance means is located at a point spaced a distance of a quarter-wavelength, at the magnetron operating fre- 15. A circuit in accordance with claim 1, wherein the magnetron has two coupling loops, wherein the main transmission line extends between one of said loops and said load, wherein the impedance of said load is unequal to the characteristic impedance of said main line, wherein said other end of the branch transmission line is connected to the other of said loops, and wherein the said capacitance means is located at a point spaced a distance of a quarter-wavelength, at the magnetron operating frequency, along the branch transmission line, from said other coupling loop.

16. A circuit in accordance with claim 1, wherein the magnetron has two coupling loops, wherein the main transmission line extends between one of said loops and said load, wherein the impedance of said load is equal to the characteristic impedance of said main line, wherein said other end of the branch transmission line is connected to the other of said loops, and wherein the said capacitance means is located at a point spaced a distance of a half-wavelength, at the magnetron operating frequency, along the branch transmission line, from said other coupling loop.

17. A circuit in accordance with claim 1, wherein the magnetron has two coupling loops, wherein the main transmission line extends between one of said loops and said load, wherein the impedance of said load is unequal to the characteristic impedance of said main line, wherein said other end of the branch transmission line is connected to the other of said loops, and wherein the said capacitance means is located at a point spaced a distance of a half-wavelength, at the magnetron operating frequency along the branch transmission line, from said other coupling loop.

18. A frequency stabilizing circuit for magnetrons comprising a magnetron oscillator the frequency of which is to be stabilized, a passive load coupled to the output of said magnetron by means of a main transmission line, a locking amplifier having an input circuit and an output circuit, means for applying a stabilized-frequency signal to said input circuit, a branch transmission line, means coupling one end of said branch line to said output circuit, means joining the other end of said branch line to said main line, and capacitance means connected across said branch line at a point spaced a distance of a half-wavelength at the magnetron operating frequency from the junction between said main and branch lines.

19. A frequency stabilizing circuit for magnetrons comprising a magnetron oscillator the frequency of which is to be stabilized, a passive load coupled to the output of said magnetron by means of a main transmission line, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and at its other end to said magnetron, and capacitance means connected across said branch line at a point spaced a distance of a half-wavelength, at the magnetron operating frequency, along said branch line from the locking amplifier output circuit, said last-named means having a reactance of substantially 1 ohm at the magnetron operating frequency.

20. A frequency stabilizing circuit for magnetrons comprising a magnetron oscillator the frequency of which is to be stabilized, a passive load coupled to the output of said magnetron by means of a main transmission line, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and joined at its other end to said main line, and capacitance means connected across said branch line at a point spaced a distance of a quarter-wavelength, at the magnetron operating frequency, along said branch line from the junction of the main and branch lines, said last-named means having a reactance of substantially 1 ohm at the magnetron operating frequency.

21. A frequency stabilizing circuit for magnetrons comprising a magnetron oscillator the frequency of which is to be stabilized, a passive load coupled to the output of said magnetron by means of a main transmission line, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and joined at its other end to said main line, the junction of the main and branch lines being located at a point spaced an integral number of half-wavelengths, at the magnetron operating frequency, along the main line, from the magnetron plane, and capacitance means connected across said branch line, said last-named means having a reactance of substantially 1 ohm at the magnetron operating frequency.

22. A frequency stabilizing circuit for magnetrons comprising a magnetron oscillator the frequency of which is to be stabilized, said magnetron having two coupling loops, a passive load coupled to the output of said magnetron by means of a main transmission line extending between one of said loops and said load, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and at its other end to the other of said loops, and capacitance means connected across said branch line, said last-named means having a reactance of substantially 1 ohm at the magnetron operating frequency.

23. A frequency stabilizing circuit for magnetrons comprising a magnetron oscillator the frequency of which is to be stabilized, said magnetron having two coupling loops, a passive load coupled to the output of said magnetron by means of a main transmission line extending between one of said loops and said load, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and at its other end to the other of said loops, and capacitance means connected across said branch line at a point spaced a distance of a quarter-wavelength, at the magnetron operating frequency, along said branch line from said other coupling loop, said last-named means having a reactance of substantially 1 ohm at the magnetron operating frequency.

24. A frequency stabilizing circuit for magnetrons comprising a magnetron oscillator the frequency of which is to be stabilized, said magnetron having two coupling loops, a passive load coupled to the output of said magnetron by means of a main transmission line extending between one of said loops and said load, the impedance of said load bearing a certain relation to the characteristic impedance of said line, a locking amplifier having an input circuit and an output circuit, means for applying a stabilized-frequency signal to said input circuit, a branch transmission line coupled at one end to said output circuit and at its other end to the other of said loops, and capacitance means connected across said branch line at a point spaced a distance of a half-wavelength, at the magnetron operating frequency, along said branch line from said other coupling loop, said last-named means having a reactance of substantially 1 ohm at the magnetron operating frequency.

25. A frequency stabilizing circuit for magnetrons comprising a magnetron oscillator the frequency of which is to be stabilized, a passive load coupled to the output of said magnetron by means of a main tranmission line, a locking amplifier having an input circuit and an output circuit, means for applying an amplitude-modulated stabilized-frequency signal to said input circuit to provide an amplitude-modulated signal at the output of said amplifier, a branch transmission line, means coupling one end of said branch line to said output circuit, means joining the other end of said branch line to said main line, and capacitance means connected across said branch line at a point spaced a distance of a half-wavelength at the magnetron operating frequency from the junction between said main and branch lines.

26. A frequency stabilizing circuit for magnetrons comprising a magnetron oscillator the frequency of which is to be stabilized, means for applying a modulating signal to said oscillator to modulate the output of the same, a passive load coupled to the output of said magnetron by means of a main transmission line, a locking amplifier having an input circuit and an output circuit, means for applying an amplitude-modulated stabilized-frequency signal to said input circuit to provide an amplitude-modulated signal at the output of said amplifier, a branch transmission line, means coupling one end of said branch line to said output circuit, means joining the other end of said branch line to said main line, and capacitance means connected across said branch line at a point spaced a distance of a half-wavelength at the magnetron operating frequency from the junction between said main and branch lines.

27. A frequency stabilizing circuit for magnetrons comprising a magnetron oscillator the frequency of which is to be stabilized, means for applying a modulating signal to said oscillator to modulate the output of the same, a passive load coupled to the output of said magnetron by means of a main transmission line, a locking amplifier having an input circuit and an output circuit, means for applying an amplitude-modulated stabilized-frequency signal to said input circuit to provide an amplitude-modulated signal at the output of said amplifier, the modulating signals applied to said oscillator and to said input circuit being substantially the same functions of time, a branch transmission line, means coupling one end of said branch line to said output circuit, means joining the other end of said branch line to said main line, and capacitance means connected across said branch line at a point spaced a distance of a half-wavelength at the magnetron operating frequency from the junction between said main and branch lines.

References Cited in the file of this patent

UNITED STATES PATENTS

| | | |
|---|---|---|
| 2,565,112 | Altar | Aug. 21, 1951 |
| 2,590,373 | Bradley | Aug. 21, 1951 |